(12) United States Patent
Anderson et al.

(10) Patent No.: US 7,105,818 B2
(45) Date of Patent: Sep. 12, 2006

(54) MICROBOLOMETER FOCAL PLANE ARRAY WITH TEMPERATURE COMPENSATED BIAS

(75) Inventors: Shane M. Anderson, Brooklyn Park, MN (US); Timothy J. McManus, Minneapolis, MN (US)

(73) Assignee: Infrared Solutions, Inc., Plymouth, MN (US)

( * ) Notice: Subject to any disclaimer, the term of this patent is extended or adjusted under 35 U.S.C. 154(b) by 0 days.

(21) Appl. No.: 11/115,921

(22) Filed: Apr. 27, 2005

(65) Prior Publication Data

US 2005/0258367 A1    Nov. 24, 2005

Related U.S. Application Data

(63) Continuation of application No. 10/373,501, filed on Feb. 23, 2003, which is a continuation-in-part of application No. 10/198,295, filed on Jul. 5, 2002, now Pat. No. 6,538,250, which is a continuation of application No. 09/414,688, filed on Oct. 7, 1999, now Pat. No. 6,444,983.

(51) Int. Cl.
*G01J 5/00* (2006.01)
(52) U.S. Cl. .................................. 250/338.1
(58) Field of Classification Search .............. 250/338.1
See application file for complete search history.

(56) References Cited

U.S. PATENT DOCUMENTS

| | | | |
|---|---|---|---|
| 5,021,663 A | 6/1991 | Hornbeck | 250/349 |
| 5,300,915 A | 4/1994 | Higashi et al. | 338/22 R |
| 5,367,167 A | 11/1994 | Keenan | 250/338.4 |
| 5,420,419 A | 5/1995 | Wood | 350/338.4 |
| 5,650,622 A | 7/1997 | Ookawa et al. | 250/332 |
| 5,729,019 A | 3/1998 | Krafthefer | 250/353 |
| 5,756,999 A | 5/1998 | Parrish | 250/332 |
| 5,811,808 A | 9/1998 | Cannata et al. | 250/332 |
| 5,831,266 A | 11/1998 | Jerominek | 250/338.4 |
| 6,023,061 A | 2/2000 | Bodkin | 250/332 |
| 6,028,309 A | 2/2000 | Parrish et al. | 250/332 |
| 6,392,232 B1 | 5/2002 | Gooch et al. | 250/332 |
| 6,444,983 B1 | 9/2002 | McManus et al. | 250/332 |
| 6,538,250 B1 | 3/2003 | McManus et al. | 250/332 |
| 2003/0213910 A1* | 11/2003 | Anderson et al. | 250/338.1 |

* cited by examiner

*Primary Examiner*—David Porta
*Assistant Examiner*—Marcus Taningco
(74) *Attorney, Agent, or Firm*—Fredrikson & Byron, P.A.

(57) ABSTRACT

A readout circuit for an array of substrate-isolated microbolometer detectors includes a bias source that varies in accordance with changes in substrate temperature as detected by a temperature sensor that has temperature characteristic that resembles the temperature characteristic of the microbolometer detector array so as compensate detector measurements for temperature induced errors in the microbolometer focal plane array read out.

15 Claims, 15 Drawing Sheets

INCIDENT INFARED RADIATION

US 7,105,818 B2

MICROBOLOMETER FOCAL PLANE ARRAY WITH TEMPERATURE COMPENSATED BIAS

RELATED APPLICATIONS

The present application is a continuation of co-pending U.S. patent application Ser. No. 10/373,501 filed Feb. 23, 2003, which is a continuation-in-part of U.S. application Ser. No. 10/198,295 filed Jul. 5, 2002, now U.S. Pat. No. 6,538,250, which is a continuation of U.S. patent application Ser. No. 09/414,688 filed Oct. 7, 1999, now U.S. Pat. No. 6,444,983, the disclosures of which are hereby incorporated in their entirety by reference herein.

FIELD OF INVENTION

The present invention relates generally to imaging systems employing a microbolometer focal plane array. More specifically, the present invention is directed to methods and circuitry for correcting temperature-induced errors in a microbolometer focal plane arrays.

BACKGROUND OF THE INVENTION

An infrared detector called the "bolometer," now well known in the art, operates on the principle that the electrical resistance of the bolometer material changes with respect to the bolometer temperature, which in turn changes in response to the quantity of absorbed incident infrared radiation. These characteristics can be exploited to measure incident infrared radiation on the bolometer by sensing the resulting change in its resistance. When used as an infrared detector, the bolometer is generally thermally isolated from its supporting substrate or surroundings to allow the absorbed incident infrared radiation to generate a temperature change in the bolometer material, and be less affected by substrate temperature.

Modern microbolometer structures were developed by the Honeywell Corporation. By way of background, certain prior art detectors and/or arrays, for example those manufactured by Honeywell, Inc., are described in U.S. Pat. Nos. 5,286,976, and 5,300,915, and 5,021,663, each of which is hereby incorporated by reference. Such detectors include those microbolometer detectors that have a two-level microbridge configuration: an upper level and a lower level form a cavity that sensitizes the bolometer to radiation of a particular range of wavelengths; the upper level forms a "microbridge" that includes a thermal sensing element; the lower level includes read-out integrated circuitry, and reflective material to form the cavity; the upper microbridge is supported by legs which thermally isolate the upper level from the lower level and which communicate electrical information therein to the integrated circuitry.

A list of references related to the aforesaid structure may be found in U.S. Pat. No. 5,420,419. The aforesaid patent describes a two-dimensional array of closely spaced microbolometer detectors which are typically fabricated on a monolithic silicon substrate or integrated circuit. Commonly, each of these microbolometer detectors are fabricated on the substrate by way of a commonly referred to "bridge" structure that includes a temperature sensitive resistive element that is substantially thermally isolated from the substrate. This aforesaid microbolometer detector structure is herein referred to as a "thermally-isolated microbolometer." The resistive element may, for example, be comprised of vanadium oxide material that absorbs infrared radiation. The constructed bridge structure provides good thermal isolation between the resistive element of each microbolometer detector and the silicon substrate. An exemplary microbolometer structure may dimensionally be on the order of approximately 50 microns by 50 microns.

In contrast, a microbolometer detector that is fabricated directly on the substrate, without the bridge structure, is herein referred to as a "thermally shorted microbolometer," since the temperature of the substrate and/or package will directly affect it. Alternately, it may be regarded as a "heat sunk" microbolometer since it is shorted to the substrate.

Microbolometer detector arrays may be used to sense a focal plane of incident radiation (typically infrared). Each microbolometer detector of an array may absorb any radiation incident thereon, resulting in a corresponding change in its temperature, which results in a corresponding change in its resistance. With each microbolometer functioning as a pixel, a two-dimensional image or picture representation of the incident infrared radiation may be generated by translating the changes in resistance of each microbolometer into a time-multiplexed electrical signal that can be displayed on a monitor or stored in a computer. As used herein, the term "pixel" is equivalent to the term "microbolometer". The circuitry used to perform this translation is commonly known as the Read Out Integrated Circuit (ROIC), and is commonly fabricated as an integrated circuit on a silicon substrate. The microbolometer array may then be fabricated on top of the ROIC. The combination of the ROIC and microbolometer array is commonly known as a microbolometer infrared Focal Plane Array (FPA). Microbolometer focal plane arrays that contain as many as 640×480 detectors have been demonstrated.

Individual microbolometer pixels will have non-uniform responses to uniform incident infrared radiation, even when they are manufactured as part of a single microbolometer FPA. This is due to small variations in the detectors' electrical and thermal properties as a result of the manufacturing process. This non-uniformity in the individual microbolometer response characteristics, commonly referred to as spatial non-uniformity, must be corrected to produce an electrical signal with adequate signal-to-noise ratio for image processing and display. The characteristics contributing to spatial non-uniformity, among others, include the infrared radiation absorption coefficient, resistance, temperature coefficient of resistance (TCR), heat capacity, and thermal conductivity of the individual detectors.

The magnitude of the response non-uniformity can be substantially larger than the magnitude of the actual response due to the incident infrared radiation. The resulting ROIC output signal is difficult to process, as it requires system interface electronics having a very high dynamic range. In order to achieve an output signal dominated by the level of incident infrared radiation, processing to correct for detector non-uniformity is required.

Methods for implementing an ROIC for microbolometer arrays have used an architecture wherein the resistance of each microbolometer is sensed by applying a uniform electric signal source, e.g., voltage or current sources, and a resistive load to the microbolometer element. The current resulting from the applied voltage is integrated over time by an amplifier to produce an output voltage level proportional to the value of the integrated current. The output voltage is then multiplexed to the signal acquisition system.

Gain and offset corrections are applied to the output signal to correct the errors that may arise from the microbolometer property non-uniformities. This process is commonly referred to as two-point correction. In this technique two correction coefficients are applied to the sampled signal of each element. The gain correction is implemented by multiplying the output voltage by a unique gain coefficient. The offset correction is implemented by adding a unique offset coefficient to the output voltage. Both analog and digital techniques have been utilized to perform this two-point non-uniformity correction.

The current state-of-the-art in microbolometer array ROICs suffers from two principal problems. The first problem is that the larger arrays increase substrate temperature. A second problem is that a larger microbolometer introduces non-uniformities in the ROIC integrated circuit output signal thereby requiring a large instantaneous dynamic range in the sensor interface electronics that increases the cost and complexity of the system. Current advanced ROIC architectures, known in the art, incorporate part of the correction on the ROIC integrated circuit to minimize the instantaneous dynamic range requirements at the acquisition systems interface.

A technique for minimizing the effect of substrate temperature variations is to provide substrate temperature stabilization so as to maintain a substantially constant substrate temperature. One common technique employed for substrate temperature stabilization is the use of what is commonly referred to as "thermoelectric cooling." As used herein, the term "thermoelectric cooler" is equivalent to the term "thermoelectric stabilizer"—both of which are commonly used in the art and refer to an apparatus and technique for raising and lowering the temperature of a substrate to maintain the substrate at a substantially constant temperature.

An unstabilized (i.e. no temperature stabilization of the substrate) microbolometer focal plane array is taught in U.S. Pat. No. 5,756,999, entitled, "Methods and Circuitry for Correcting Temperature-Induced Errors in Microbolometer Focal Plane Array", issued to Parrish, et. al. Therein, a bias correction method and a pre-bias correction method are taught. With regard to the bias correction method, as stated therein, "According to the bias-correction method, a unique bias amplitude is applied to each detector during the integration period to support uniformity correction. The bias-correction method can be implemented as an adjustable voltage, current, or load bias that is applied to the microbolometer detectors during the integration (measurement) period . . . . The bias-correction value is applied during the integration period of the microbolometer detector using an adjustable voltage source . . . . The bias-correction value is controlled by the output of a digital-to-analog converter (DAC) . . . . The adjustable bolometer bias may be used to correct the optical gain of the signal for uniform output at a particular substrate temperature in conjunction with single-point offset correction . . . to remove residual fixed offsets."

Although the aforesaid patent sets forth improved methods for correcting temperature induced errors in microbolometer focal-plane arrays, these methods still remain complex and time consuming.

Another method for controlling bias for a microbolometer focal plane array permitting an unstabilized (i.e. no temperature stabilization of the substrate) microbolometer focal plane array is taught in U.S. Pat. No. 6,444,983, entitled, "Microbolometer Focal Plane Array With Controlled Bias," in the name of T. McManus, et. al., and is incorporated herein by reference thereto. As taught therein, a single thermally-shorted microbolometer detector is employed for controlling the magnitude of an electric signal bias source that is applied to all microbolometers of a focal plane array on a substrate. A calibration bias source magnitude is determined and continually adjusted as a function of the reading value of the resistance of the thermally-shorted microbolometer at calibration, and readings of the thermally-shorted microbolometer after each image sample is taken. With the bias controlled in a manner as just described, temperature induced errors are minimized thereby permitting the microbolometer focal plane array to be employed without the need of any thermoelectric stabilization of the substrate.

Another source of error in microbolometer focal plane arrays is the variation in "responsivity" of each microbolometer with changes in temperature. This is because each microbolometer is a temperature sensitive resistor having a sensitivity that varies due to minute variances in the manufacturing process from one microbolometer to another. The temperature of a microbolometer is affected by the bias current flowing there through, since that current inherently warms the microbolometer due to the power dissipated. Heat is also transferred to the microbolometer through the focal plane array's substrate. Heat is also transferred to the microbolometer by infrared radiation focused on the microbolometer.

In order to produce a high quality image from a microbolometer focal plane array, the differences in responsivity from one microbolometer to another need to be taken into account, and the change in microbolometer resistance due to infrared radiation impinging thereon should be separated from any resistance changes due to all other sources of heat transfer.

SUMMARY OF THE INVENTION

An object of the present invention is to provide a simple method for correcting for temperature induced errors in microbolometer focal-plane arrays.

Another object of the present invention is to provide a simple method for correcting for temperature induced errors in microbolometer focal-plane arrays without the necessary use of digital-to-analog converters.

Another object of the present invention is to provide a method of processing pixel information of a microbolometer focal plane array without focal plane array substrate temperature stabilization.

In accordance with the present invention, a readout circuit method and circuit arrangement is provided for a microbolometer imaging apparatus that includes an array of selectable substrate-isolated microbolometer detectors, where a resistance value $Rpixel_n$ is associated with each nth detector, $D_n$. The readout circuit includes a temperature sensor, thermally coupled to the substrate of the detector array, for substantially sensing the temperature of the substrate, and where the temperature sensor exhibits an electrical sensor parameter that has a temperature characteristic behavior resembling the temperature characteristic behavior of the array of detectors in response to changes in substrate temperature. An electrical bias source generator provides an electrical bias source as a function of the electrical sensor parameter of the temperature sensor. A first circuit is provided for sequentially establishing an electrical pixel parameter as a function of the electrical bias source and the detector resistance, $Rpixel_n$, for selected ones of the detectors. A second circuit responsive to the electrical pixel parameter is provides an electric signal output signal, $Sout_n$, as a function of said electrical pixel parameter.

In a more specific readout circuit arrangement in accordance with the present invention, a plurality of temperature sensors are thermally coupled to the substrate where each one is in thermal proximity to a selected row or column of the detector array, and the electrical bias source is a function of an average of the electrical sensor parameter of the plurality of temperature sensors.

In a more specific readout circuit arrangement in accordance with the present invention, the temperature sensor is a heat-sunk pixel, and the electrical bias source is a function of the heat-sunk pixel resistance, Rhs. Where the electric bias source is an electric potential having a magnitude, Vbias proportional the heat-sunk resistance value, Rhs.

BRIEF DESCRIPTION OF THE DRAWINGS

FIG. 14b is a schematic diagram of a bias circuit for an array of microbolometer thermally shorted pixels on the same substrate as those associated with the circuit of FIG. 14a.

DETAILED DESCRIPTION OF THE INVENTION

Figure 1A:
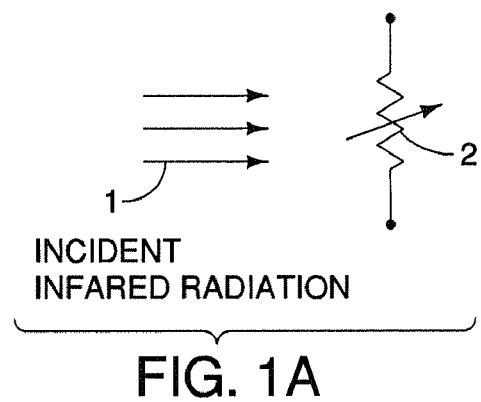
FIG. 1A–1C are schematic diagrams of prior art bolometer circuits.
Figure 1B:
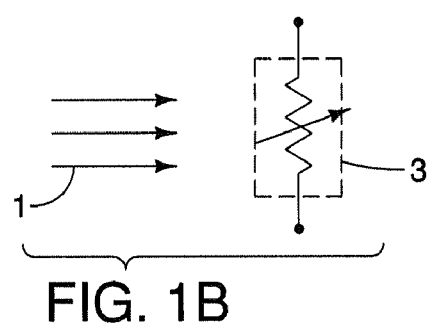
Figure 1C:
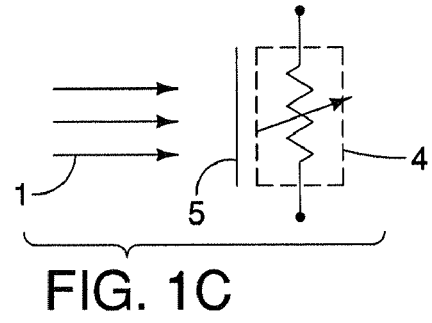

Constructions of microbolometer focal plane arrays and application circuitry are taught in the aforesaid U.S. Pat. No. 5,756,999 and is incorporated herein by reference. Individual microbolometer detectors including both thermally-isolated and thermally-shorted varieties, and associated detector circuitry are also described in detail therein. However, the following excerpt is provided as a foundation for the description of the present invention that follows:

FIG. 1A, 1B and 1C illustrate three possible configurations for microbolometer detectors. Incident infrared radiation 1 is projected onto each of the microbolometer detectors. The microbolometer detector 2, shown in FIG. 1A, is thermally shorted to the substrate material, herein referred to as the thermally-shorted microbolometer or heat sunk pixel. This is a common form of bolometer and is representative of most single-detector bolometers and thermistors. Microbolometers can be manufactured to provide a high thermal conductivity to the substrate, or this property can be introduced through post-processing whereby a thermally conductive material is selectively applied to these microbolometer detectors. Although this detector is thermally connected to the substrate, the resistance properties and temperature coefficient of resistance (TCR) of these detectors are [intended to be] equivalent to the thermally-isolated microbolometer detector 3, shown in FIG. 1B. These detectors have a high TCR (1% to 5%/degree C.) which is designated by the arrow in the resistor symbol.

The thermally-isolated microbolometer 3 is most commonly used to sense infrared radiation. Thermally-isolated microbolometer 3 is thermally isolated from its supporting substrate or surroundings to allow the absorbed incident infrared radiation to generate a temperature change in the microbolometer material. In FIG. 1B, the dashed square box around the detector designates this isolation.

The final configuration, shown in FIG. 1C, is the shielded microbolometer 4. The shielded microbolometer 4 is identical to the thermally-isolated microbolometer 3 with the exception that incident infrared radiation 1 is shielded from the microbolometer. The radiation shield is designated by a solid line 5 in FIG. 1C.

The principles of operation for the microbolometers shown in FIGS. 1A–1C are as follows. The temperature of the non-isolated microbolometer 2 is dominated by the high thermal conductivity to the substrate. Therefore incident infrared radiation and electrical power dissipated in the microbolometer have little effect on the temperature of the microbolometer. Microbolometer 2 has the same high TCR as the thermally isolated microbolometer 3 and therefore provides a high sensitivity reference to the substrate temperature.

The thermally-isolated microbolometer 3 changes temperature in response to the incident radiation level changes in the substrate temperature, and the electrical power dissipated in the detector during the measurement of the microbolometer resistance. The heating due to resistive measurement is referred to as self-heating. As fabricated, the thermally isolated microbolometer is not perfectly insulated from the substrate. Therefore the temperature of the thermally isolated microbolometer does track the substrate temperature to some extent, although the rate of temperature change due to this mechanism is much slower than those due to incident radiation or self-heating.

The shielded isolated microbolometer 4 does not change temperature in response to the incident radiation level, but does change temperature as a result of self-heating and temperature changes in the substrate.

Figure 2:
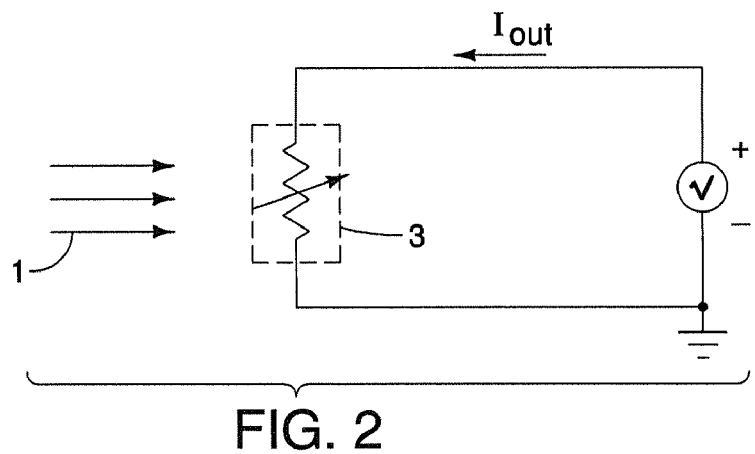
FIG. 2 is a schematic diagram illustrating an applied voltage bias method for measuring microbolometer resistance.
Figure 3:
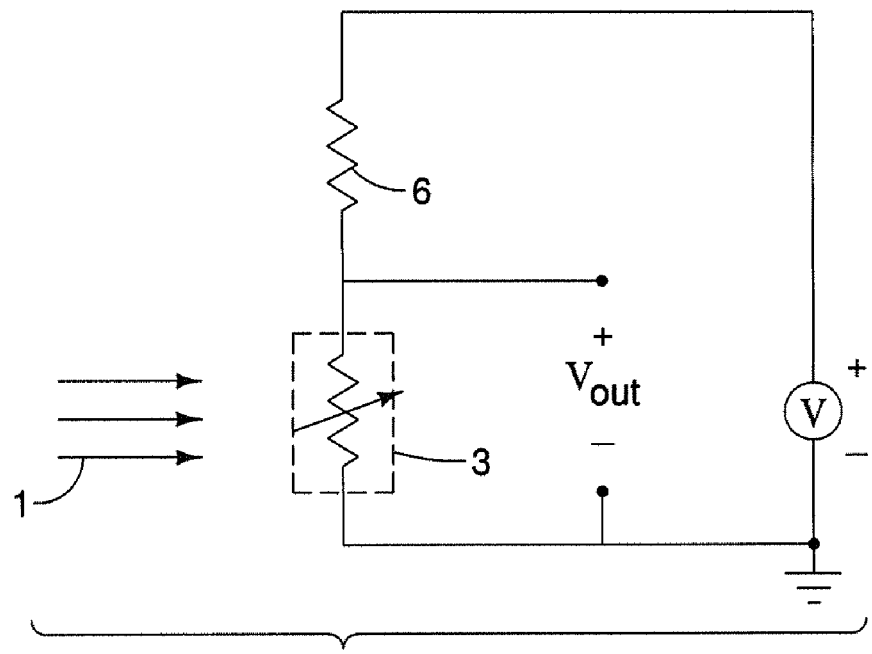
FIG. 3 is a schematic block diagram illustrating an applied current bias method for measuring microbolometer resistance.
Figure 4:
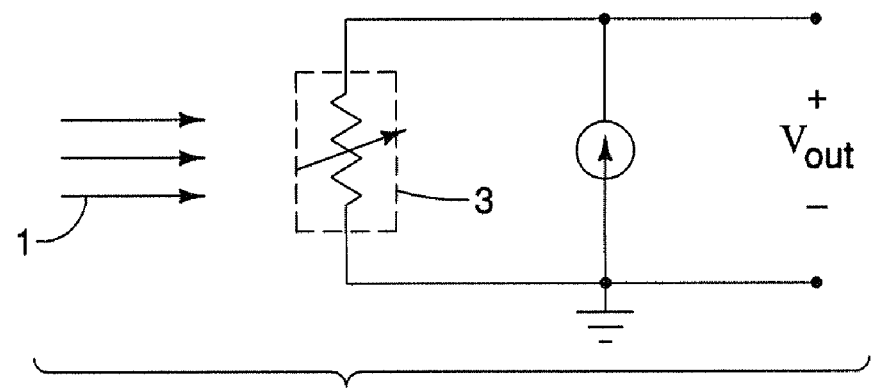
FIG. 4 is a schematic block diagram illustrating an applied voltage bias method for measuring microbolometer resistance.

FIGS. 2–4 illustrate three commonly used techniques for measuring the resistance of a microbolometer detector. FIG. 2 shows an applied electric bias voltage method of sensing the detector resistance. An applied voltage bias is used to generate a current in the circuit designated Iout. By measuring the current Iout, the resistance of the microbolometer detector can be determined. The relationship between the applied voltage and measured current is defined by Ohms Law.

$$I_{out} = V_{applied}/R_{bolometer} \quad (1)$$

Where $I_{out}$ is the measured current, $V_{applied}$ is the applied voltage bias, and $R_{bolometer}$ is the microbolometer detector resistance.

A second method for measuring the microbolometer resistance is shown in FIG. 3. Here a constant electric current bias is applied to the microbolometer detector 3, and the voltage that develops across the microbolometer as a result is measured. Again, Ohms Law defines the relationship between the applied current and the measured voltage.

$$V_{out} = I_{applied} * R_{bolometer} \quad (2)$$

A third method for measuring the microbolometer resistance is shown in FIG. 4. This circuit includes a resistive load 6. A voltage is applied across the series combination of the microbolometer 3 and the load 6. The microbolometer resistance can be determined by measuring the voltage across the microbolometer. The following expression describes the microbolometer resistance as a function of applied voltage bias, load resistance, and the measured voltage across the microbolometer.

$$R_{bolometer} = R_{load}/[V_{applied}/V_{out} - 1] \quad (3)$$

where Rload is the value of load resistor 6.

These circuit implementations may be used to measure infrared radiation incident on the microbolometer by sensing the change in microbolometer temperature due to the optical (infrared) energy absorbed by the detector. The temperature rise in the microbolometer detector due to self-heating generally is significantly larger than the temperature rise resulting from the incident infrared radiation. The relatively small contribution of incident radiation to the change in microbolometer resistance is difficult to detect. For this reason, it is desirable to incorporate more complex circuits using in-circuit reference schemes in order to minimize the contribution of self-heating to the output signal. In the case of the resistive load circuit approach (FIG. 4), the load resistor 6 may be designed to have a low temperature coefficient of resistance, or it may be thermally shorted to the substrate, or shielded from incident infrared radiation.

In the present invention, the thermally-shorted microbolometer 2 depicted in FIG. 1A may be thought of as a heat-sunk pixel. This heat-sunk pixel may be constructed by way of thermally shorting a thermally-isolated microbolometer by way of a thermally conductive paste, or other techniques. However, it is of paramount importance in accordance with the present invention that the heat-sunk pixel is primarily responsive to the temperature of the substrate upon which the thermally-isolated microbolometers are constructed.

Commonly, the outputs as described by the aforementioned equations are converted to a digital representation or number by way an analog-to-digital output converter (A/D converter). The A/D output converter generally has a limited range from zero to some maximum value.

Circuits and methods similar to those just described have been commonly employed in conjunction with a thermoelectric stabilizer coupled to the FPA substrate so as to maintain the substrate at a constant temperature and thereby avoid large swings in the output measurements. This is because only the detected temperature change induced by infrared radiation is desired.

Figure 5:
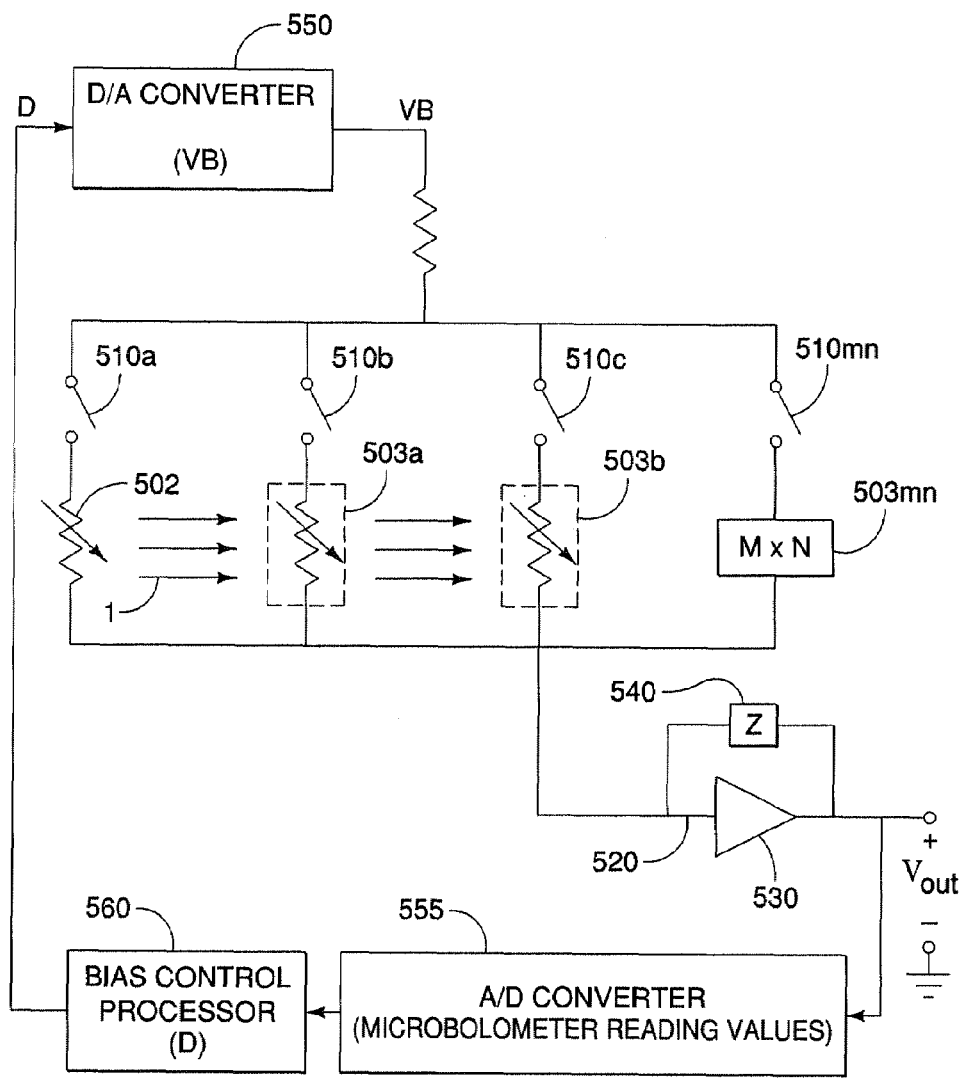
FIG. 5 is a schematic block diagram of bias controlled microbolometer system as taught in U.S. Pat. No. 6,444,983.

FIG. 5 is a simplified schematic diagram of microbolometer imaging apparatus with controlled bias as taught in U.S. Pat. No. 6,444. There shown are one thermally-shorted microbolometer 502 and two thermally-isolated microbolometers 503a and 503b. A variable bias voltage (VB) or electric potential is applied to one terminating end of each of the microbolometers 502, 503a, and 503b through multiplex switches 510a–510c, respectively. The other terminating end of each of the microbolometers is connected to an input terminating means 520 of amplifier 530 having an appropriate gain as determined by feedback impedance 540. In turn, the output of amplifier 530 is connected to A/D converter 555.

In FIG. 5, the variable applied voltage bias VB is provided by way of a digital-to-analog converter (D/A converter) 550, which receives a digital signal D from a bias control processor 560. Bias control processor 560 is intended to be responsive to selected output information from A/D converter 555 in a manner which will be subsequently described with reference to FIG. 6 and FIG. 7. It should be noted that associated with a digital-to-analog converter 550 is a "bias range", i.e. the output voltage bias VB may vary between some selected minimum and a maximum.

Bias control processor 560 is intended to serve as a feedback information processor for controlling the applied voltage bias, simply referred to as "bias," as a function of selected historical information as derived form the behavior of the both the thermally-isolated-microbolometers 503a and 503b, and the thermally-shorted-microbolometer 502.

It should be noted that microbolometers 503a and 503b are representative of a typical microbolometer comprising an M×N array microbolometers identified in FIG. 5 as 503mn. Each of the M×N array microbolometers are multiplexed to the detector circuit through switches identified by switch 510mn as is well understood in the art. However, it should be understood that in accordance with the present invention, that the detector circuit employs a common electric signal bias source VB for deriving the desired information, namely the resistance of each of the bolometers of the M×N array.

Figure 6:
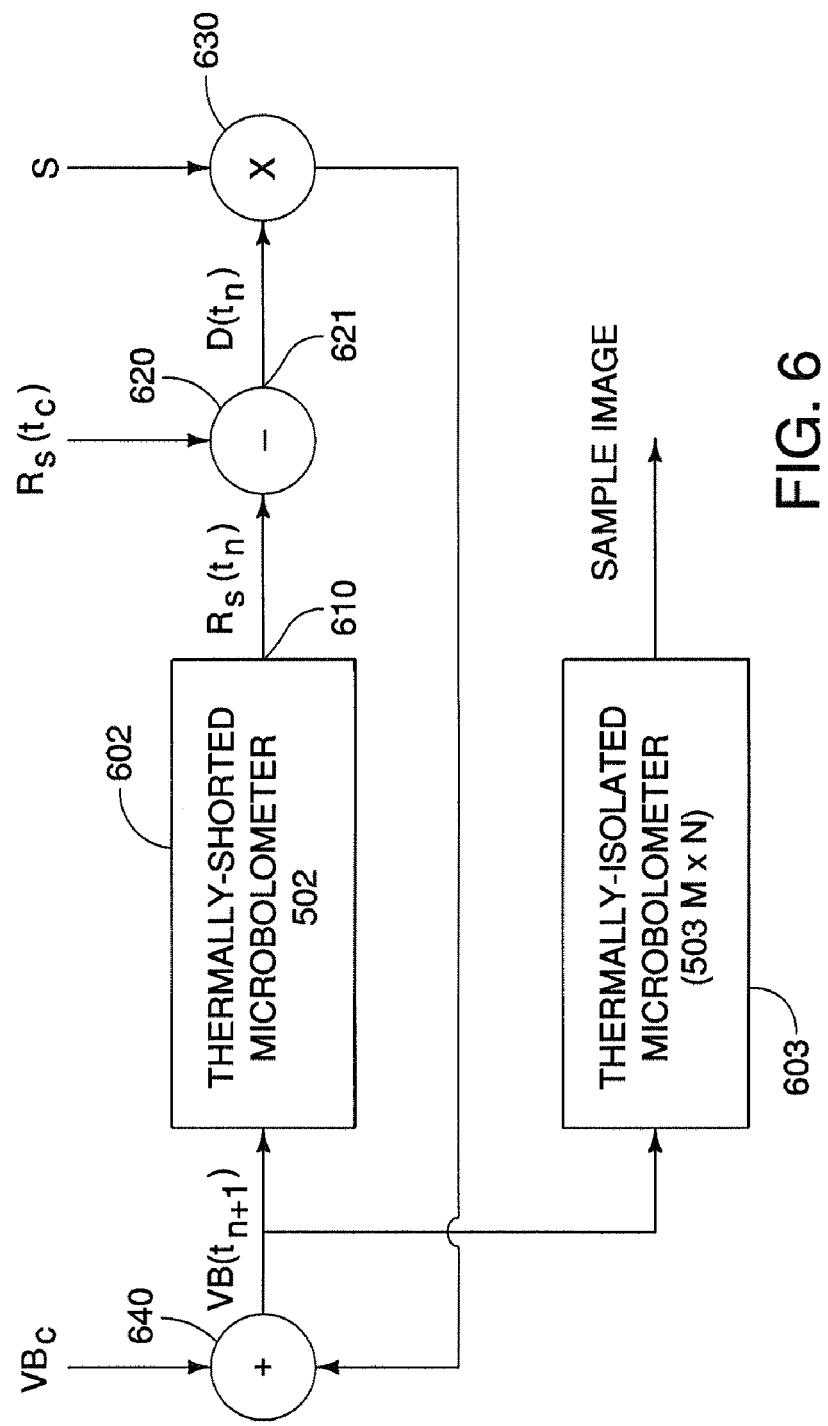
FIG. 6 is a block diagram depicting the bias control feedback scheme as taught in U.S. Pat. No. 6,444,983.

FIG. 6 is a schematic block diagram illustrating a feedback arrangement as taught in. U.S. Pat. No. 6,444,983 for controlling the applied voltage bias. Thereshown is block 602, which represents thermally-shorted microbolometer 502 and corresponding detector circuitry as illustrated in FIG. 5, for reading the resistance value $R_s(t_n)$. The output 610, thereof, represents the resistance $R_s(t_n)$ of the thermally-shorted-microbolometer 502 at sample time $t_n$. Difference block 620 is intended to provide an output 621 representative of the difference between $R_s(t_c)$ and the current value of the resistance, $R_s(t_n)$, of the thermally-shorted-microbolometer 502. $R_s(t_c)$ represents the resistance of the thermally-shorted-microbolometer 502 at the "calibration time $t_c$". $VB(t_c)$ represents an initial value of the voltage bias at the calibration time $t_c$. In turn, the output of difference block 620 is multiplied by a scale factor in block 630. The output of block 630 is provided as one input to summing block 640 which is intended to be summed with the initial bias value, $VB(t_c)$.

Before proceeding, it should be recognized that each microbolometer of the focal plane array exhibits its own temperature-resistance characteristic. As is well understood in the art, a common calibration routine exposes the focal plane array to a black-body at a known temperature, and in which the microbolometer array is at a known ambient operating temperature, and in which an electric signal bias source of a selected magnitude is applied to each of the microbolometers. The magnitude of electric signal bias source employed in the detector circuit is, of course, a matter of design choice. However, in accordance with preferred embodiment of the invention, the initial value VB($t_c$) of the applied voltage bias is intended to be such that the average of the output reading values of all of the thermally-isolated-microbolometers at substantially the calibration sample time is such that the resultant output of the A/D converter 555 is centered in the range of the AND converter 555.

Further, at the calibration time $t_c$, the thermally-shorted-microbolometer 502 will exhibit its own characteristics, and have a particular initial temperature value at the calibration sample time $t_c$. As taught in U.S. Pat. No. 6,444,983, the applied voltage bias for all of the microbolometer detectors is intended to be adjusted or varied to a new value for the next sample time of the image as a function of the difference between the current value of the resistance of the thermally-shorted-microbolometer 502 associated with the last sample time of an image, and the resistance of the thermally-shorted-microbolometer 502 at the calibration time $t_c$.

Figure 7:
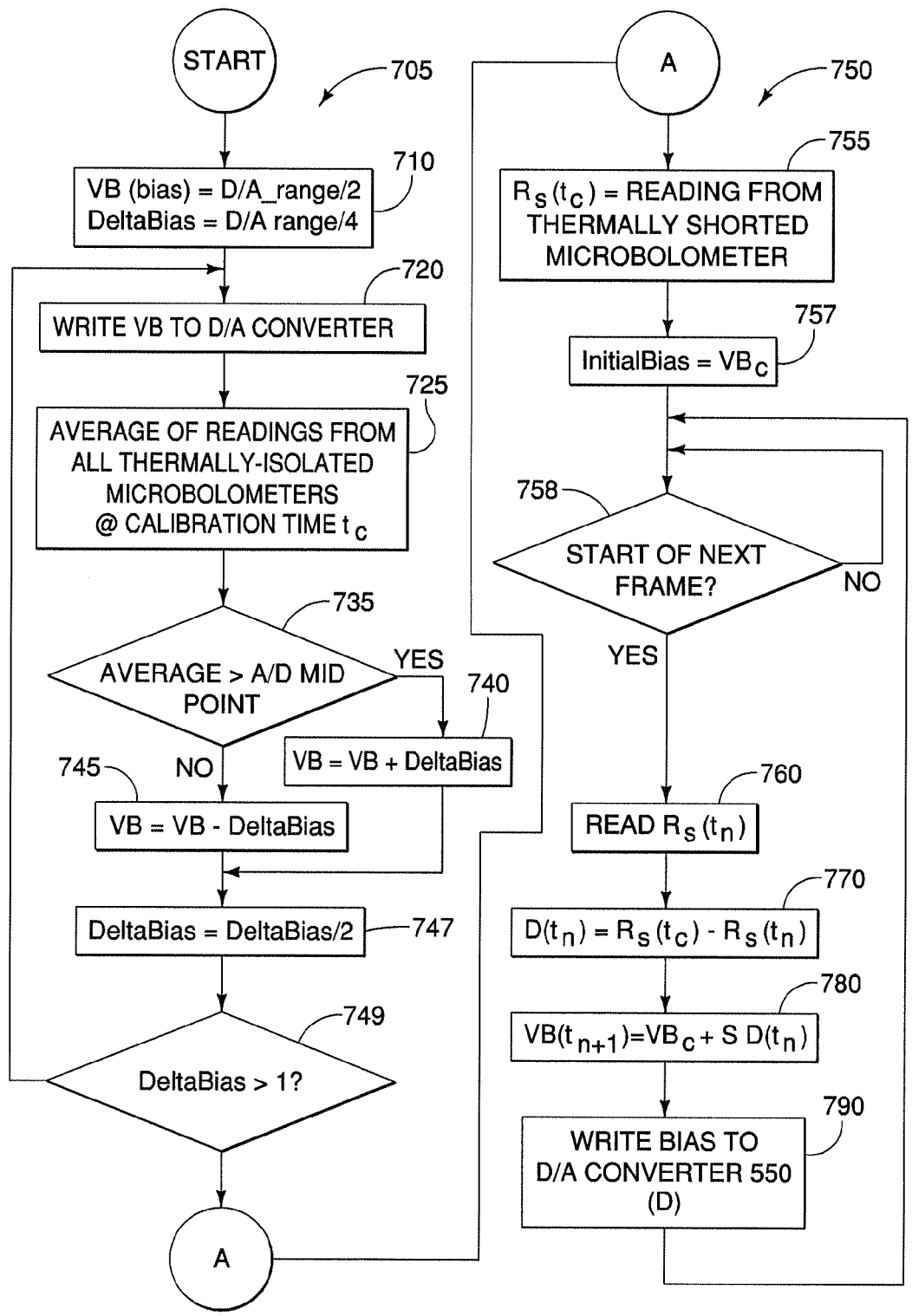
FIG. 7 is a flow diagram illustrating the bias control feedback system as taught in U.S. Pat. No. 6,444,983.

The aforementioned calibration procedure described above is particularly described in the flow diagram depicted in FIG. 7 which is intended to be implemented by way of hardware, firmware, software, or the like. The method, exemplified in FIG. 7 includes a binary search method, 705, for determining an "initial calibrated bias value," and a bias control loop 750. Briefly, the bias is set, block 710, to an initial value which corresponds to the midpoint of the range of the D/A converter 550 which provides the bias to all of the microbolometers 502, 503$a$, and 503$b$. All of the M×N thermally-isolated microbolometers 503$mn$ are sampled at an instant of time, and the digital output readings from A/D converter 555 are averaged, block 725, and compared, block 735, with the midpoint of the range of the A/D converter 555. In turn, the digital value of the bias is incremented or decremented, blocks 740 and 745, by a "delta bias value"—initially set to one fourth of the range of the D/A converter 550, and value of delta bias is reduced by half, block 747. This process continues until a limit is reached where no further improvement may be made—delta bias is less than one, block 749. At the end of this binary search, an "initial calibrated bias value," VB($t_c$), has been determined at which the average of all of thermally-isolated microbolometers is at the midpoint of the output A/D converter 555.

Immediately following the determination of the "initial calibrated bias value," VB($t_c$), a bias control loop, 750, is implemented. First, a microbolometer resistance reading value, identified by $R_s(t_c)$, is taken from the thermally-shorted microbolometer 502 immediately after the initial calibration bias value has been determined, block 755, 757. The resistance value $R_s(t_c)$ is essentially representative of the substrate temperature at the calibration time and is herein referred to as the "calibration substrate temperature value." $R_s(t_c)$ occurs with the bias set at the initial calibrated bias value, VB($t_c$). After each image sample time, i.e., microbolometer 503 detector values determined and stored, the current reading sample of the thermally-shorted-microbolometer 502 $R_s(t_n)$, block 760, is subtracted from the calibration substrate temperature value $R_s(t_c)$, block 770. The difference D(tn) is multiplied by a constant or scale factor, S, and added to the initial calibrated bias value VB($t_c$), block 780. In turn, the bias is changed to the new value, block 790, and another image sample or frame is taken, block 758—the process repeating.

Preferably, the scale factor S is empirically determined during calibration. That is, the microbolometer array is subjected to various ambient temperatures in order to determine sensitivity of the thermally-isolated microbolometers with regard to applied bias and temperature.

In the foregoing description of the present invention, and particularly the detector arrangement of FIGS. 2 and 5, an applied electric potential or voltage was utilized as the "bias" for operating the microbolometers. However, it should be recognized that the bias control scheme as illustrated therein, and particularly described by way of FIGS. 5, 6 and 7, may be applicable to any electric signal source, including electric potential sources as utilized in FIGS. 2 and 4, and current sources as depicted in FIG. 3. More specifically, a current source may be calibrated initially to a calibration bias value which may be varied in accordance with the difference between the calibration substrate temperature value $R_s(t_c)$ and the subsequent samples of the same thermally shorted microbolometer detector.

As should be apparent to those skilled in the art, the flow diagram illustrated in FIG. 7 may be implemented by a wide range of devices for implementing a set of instructions including microprocessors, computers, specific hardware, firmware, and the like. Although, A/D and D/A converters have been illustrated other forms of electronic implementation for control of an electrical bias and reading of the microbolometer values and associated information are, of course, possible.

Factory Calibration vs. Field Calibration

The aforementioned calibration procedure described above, and particularly described in the flow diagram depicted in FIG. 7, may be performed at various times. One calibration time is while the microbolometer camera is being manufactured. In this case, the camera could be subjected to various ambient temperatures as well as exposed to calibrated blackbody emissions to determine the scale factor S—this process may be called the "factory calibration." Another possible time for "calibration" is during normal operation, when the camera may use a shutter as a uniform target for purposes of further "calibration." It is important to note that data taken during "factory calibration" would be extensive, and could be used to correlate heat-sunk pixel readings to biasing points (e.g., to determine the scale factor, S). Factory calibration may be utilized to substantially establish bias for the electronics at desired target bias levels. Calibrations in the field, using a shutter or similar target, may then be employed to further refine the "factory calibration."

Separate Heat Sunk Pixel Measurement Circuit vs. Multiplexed Arrangement

In FIG. 5, the heat sunk pixel 502 is shown multiplexed with the thermally isolated pixels, 503$mn$. A heat sunk pixel that is not multiplexed with the thermally isolated pixels, but still placed on the substrate could also be used as a source for the method described herein. A discrete heat-sunk pixel such as this would require a separate circuit to measure its resistance. One possible circuit could consist of a common thermistor conditioning circuit, well known in the art, along with a dedicated analog to digital converter. This separate circuit would allow the heat-sunk pixel resistance to be measured at a rate differing from the overall frame rate of the microbolometer camera. Such a circuit could allow for more accurate measurements of the heat-sunk pixel value. For example, the heat-sunk pixel resistance could be sampled once per row versus once per frame. This could enhance the responsiveness of the method described herein. Also, since the heat sunk pixel would not need to be sampled as often as thermally-isolated pixels, the heat sunk pixel could be sampled with more precision by using an A/D converter with more bits than the A/D used for the thermally-isolated pixels.

Before proceeding, it should be noted that the heat sunk pixel serves as a temperature sensor having an electrical sensor parameter, namely resistance, that has a temperature characteristic behavior resembling the temperature characteristic behavior of the array of detectors in response to changes in substrate temperature, and preferably will significantly correlate with substrate temperature variations. Alternate temperature sensors, for example thermistors and the like, therefore may also be used that have similar characteristics as aforesaid, and are intended to be within the true spirit and scope of the present invention.

Figure 8:
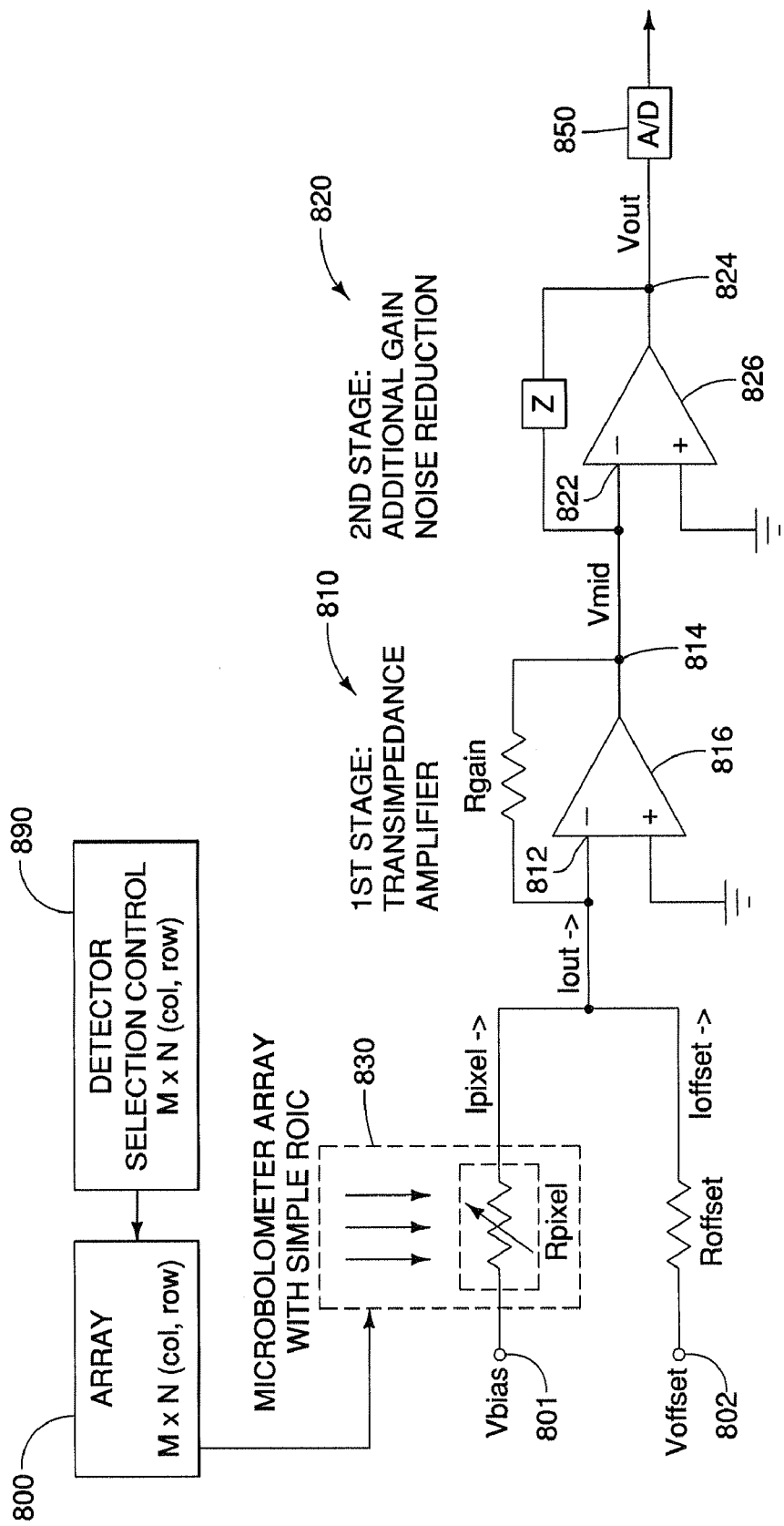
FIG. 8 is a schematic block diagram of a readout system for a microbolometer pixel array in accordance with the present invention.

FIG. 8 is a schematic block diagram illustrating an exemplary embodiment in accordance with the method and circuitry of the present invention. The circuit arrangement illustrated in FIG. 8 is depicts an exemplary circuit implementation and method of the applied voltage bias method shown previously in FIG. 2. In FIG. 8, an M×N array of microbolometer detectors is numerically identified by block 800. Each thermally-isolated microbolometer detector, $D_{mn}$, is sequentially coupled to the readout circuit by a M×N pixel selection controller 890. The selected pixel or detector is numerically identified in FIG. 8 by numeral 830. An exemplary circuit arrangement of array 800 and pixel selection controller similar to ones known in the art is particularly illustrated in FIG. 12.

As illustrated, the selected detector or pixel 830 is electrically coupled between an electrical bias source and electrical parameter amplifier or signal conditioning circuit. Where the bias source is an electric potential, and the electrical parameter is pixel current, as illustrated in FIG. 8, the selected detector is electrically coupled to a first stage transimpedance amplifier 810 followed by a second stage transimpedance amplifier 820—the latter providing additional gain and noise reduction as desired.

In turn the output of the second stage transimpedance amplifier 820 is coupled to the input of an A/D converter 850—similar to the arrangement as illustrated in FIG. 5. The gain of the first stage transimpedance amplifier 810 is substantially determined by gain adjust resistor Rgain connected between the inverting input 812 and output 814 of operational amplifier 816. The gain and behavior of the second stage transimpedance amplifier 820 is substantially determined by the choice of impedance Z connected between the inverting input 822 and output 824 of operational amplifier 826.

As indicated above, the pixel bias voltage, Vbias, is coupled to one end of the selected thermally isolated pixel 830, having pixel resistance Rpixel. The other end thereof is coupled to the inverting input 812 of operational amplifier 816. An offset voltage, Voffset, is also coupled to the inverting input 812 of operational applier 816 through a series connected offset resistor, Roffset, 832. The non-inverting input of operational applier 810 is shown coupled to electrical ground 839.

According to ideal operational-amplifier theory, there is a virtual short between the plus and minus input nodes of the op-amp, therefore the voltage at the inverting input of the op-amp will be zero volts (ground potential). Assuming ideal characteristics, standard circuit analysis yields the following equations:

$$I\text{pixel}=V\text{bias}/R\text{pixel} \qquad (4)$$

where Ipixel is the resulting current through the currently selected microbolometer pixel 830 due to the applied bias voltage, Vbias, and the resistance of the pixel, Rpixel. (Ohms law)

$$I\text{offset}=V\text{offset}/R\text{offset} \qquad (5)$$

where Ioffset is the resulting current through the resistor Roffset due to the applied bias voltage Voffset. (Ohms law)
Accordingly, $$I\text{out}=I\text{pixel}+I\text{offset} \qquad (6)$$

Iout is the current coupled to the transimpedance amplifier. It is the sum of the currents Ipixel and Ioffset. (Kirchoffs current law).
Further, $$V\text{mid}=-I\text{out}*R\text{gain} \qquad (7)$$

Where Vmid is the output of the $1^{st}$ stage transimpedance amplifier, Rgain is the feedback resistance which defines the amplifiers gain.

$$V\text{out}=-Z*V\text{mid} \qquad (8)$$

Where Vout is the final output voltage, and Z is the voltage gain of the $2^{nd}$ stage amplifier. Substituting equation 7 into equation 8 yields:

$$V\text{out}=Z*R\text{gain}*I\text{out} \qquad (10)$$

And combining Z and Rgain into a single transimpedance gain term G:

$$G=Z*R\text{gain} \qquad (11)$$

Yielding an equation for Vout, defined by Iout and overall gain G.

$$V\text{out}=G*I\text{out} \qquad (12)$$

Expanding various ways yields:

$$V\text{out}=G*(I\text{pixel}+I\text{offset}) \qquad (13)$$

$$V\text{out}=G*I\text{pixel}+G*I\text{offset} \qquad (14)$$

$$V\text{out}=G*(V\text{bias}/R\text{pixel}+V\text{offset}/R\text{offset}) \qquad (15)$$

$$V\text{out}=G*(V\text{bias}/R\text{pixel})+G*(V\text{offset}/R\text{offset}) \qquad (16)$$

It should be noted that Rpixel may be different for each microbolometer pixel in the focal plane array, each of which varies due to self-heating, substrate temperature, as well as incident infrared radiation. The value of Rpixel is of course the key measurement that the aforedescribed circuit is designed to measure.

Preferably, Ipixel (and hence, Vbias) must have a magnitude large enough to yield a reasonable signal-to-noise ratio for Vout, yet not so large that self-heating effects degrade the microbolometer performance. Vbias and Rpixel, as shown in equation 4, determine Ipixel. It should also be noted that Ipixel affects the microbolometer responsivity. Ioffset is an offset current that is used to significantly center the output voltage Vout within the range of the A/D converter 850. When Ioffset is set such that Ioffset=-Ipixel_avg, the average value of Vout will be substantially near zero. Voffset and Roffset as shown in equation 5 determine Ioffset.

Figure 9A:
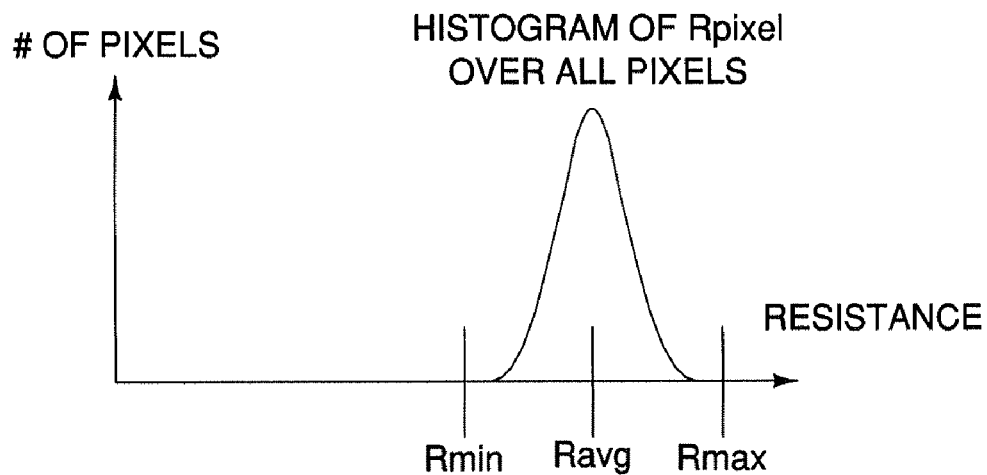
FIGS. 9a and 9b are graphical depictions of the distribution of pixel responses to a given radiation.
Figure 9B:
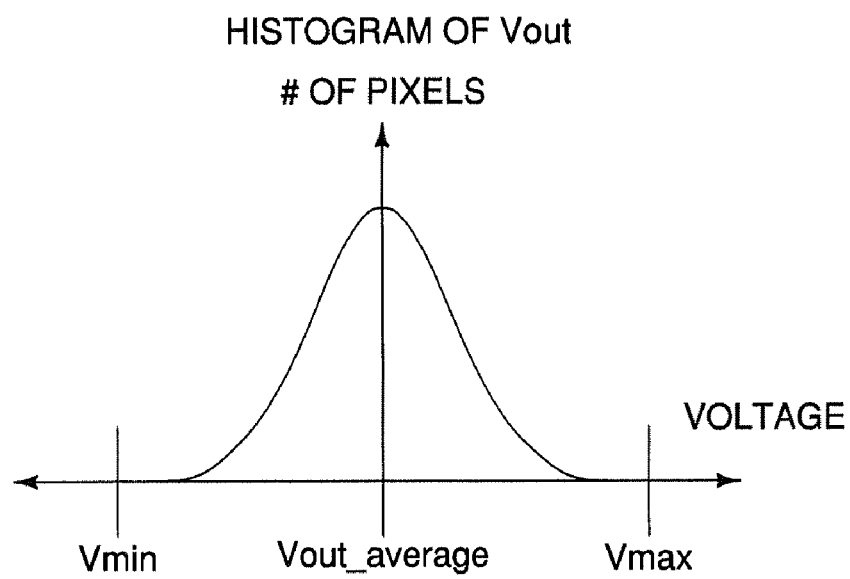

Overall transimpedance gain G is chosen to be as large in magnitude as possible, while maintaining the dynamic range required to keep the resulting Vout voltages from exceeding the range of Vmin to Vmax, as shown in FIG. 9b as will be subsequently described. Note that the polarity of G could be either positive or negative, but as depicted in FIG. 8 the polarity would be positive.

A typical distribution of pixel resistances for a microbolometer focal plane array with uniform incident radiation is graphically depicted in FIG. 9a. Changes in resistance due to incident radiation tend to be significantly smaller than the inherent non-uniformity in the array, at least with regard to common incident radiation levels. A corresponding distribution of Vout values for the pixel resistances shown in FIG. 9a is graphically depicted in FIG. 9b.

It is an object of the present invention to achieve and maintain a preferred "centered" Vout distribution by appropriate "biasing" of the microbolometer FPA as illustrated in FIG. 9b over a wide range of operating ambient temperatures by appropriate selection and control of the bias voltage Vbias. In FIG. 9b, voltage Vout_average is preferably centered at the midpoint between Vmin and Vmax—the predicted output Vout. The overall gain G is selected to be just high enough to use nearly all of the A/D converter's 850 input range.

As is well known to those skilled in the art, changes in pixel resistance due to incident radiation tend to be significantly smaller than the inherent non-uniformity in the array, at least with regard to common incident radiation levels, so this is generally adequate for accommodating typical infrared scenes. If scenes with very large temperature differences are expected to be imaged with the FPA, the overall gain G can be set lower, thus accommodating a larger "dynamic range." Gains too high would "widen" or "spread" the histogram shown in FIG. 9b, and Vout values for some microbolometer pixels would then be out of the input range of the A/D (i.e., greater than Vmax or less than Vmin). Gains that are too low would "compress" the histogram in FIG. 9b and thereby decrease the effective resolution of the A/D converter 850, as well as leave a portion of the input range thereof unused.

It should be understood that real microbolometer FPAs often have pixel resistance distributions that are not smooth, symmetric Gaussian distributions like that illustrated in FIG. 9a. Instead, they often have distributions that are skewed, bimodal, etc. It should be further understood that in such cases, the goal of biasing is to shift the Vout distribution so that most (e.g. 95% or more) of the pixel Vout values are within the input range of the A/D. In such cases, the true, mathematical average of the Vout distribution may not be exactly centered in the A/D input range.

It should also be further understood that there may be situations where it would be advantageous to purposely bias the Vout distribution off of the center of the A/D input range. An example would be when the expected target scene has objects that are much hotter than room temperature, but not any (or few) objects that are lower than room temperature.

In the description of the present invention hereinafter, biasing will be described as "centering" the Vout distribution or Vout_average in the A/D input range; however, this is not intended to limit the scope of the present invention. It will be clear to those skilled in the art that the exact "positioning" of the Vout distribution within the A/D converter input range will be a matter of design choice for a given focal plane array and imaging system application. In accordance with the present invention, methods and circuits are described herein which are intended to keep the average value of Vout at an optimal point and within the input range of the A/D converter.

Assuming that the target Vout_average is zero volts (e.g. center value for a bipolar input for an A/D converter), then by substituting zero volts for Vout and rearranging equation 15 yields:

$$\frac{Vbias}{\text{Rpixel\_zero}} = -\frac{Voffset}{Roffset} \quad (17)$$

Where Rpixel_zero is the resistance of a pixel which would yield zero volts for Vout. Rpixel_zero is substantially equivalent to Rpixel_avg when the distribution of resistances as shown in FIG. 9a is symmetrical. Substituting Rpixel_avg for Rpixel zero yields:

$$\frac{Vbias}{\text{Rpixel\_avg}} = -\frac{Voffset}{Roffset} \quad (18)$$

This intuitively follows since when Ipixel=−Ioffset then Iout equals zero and therefore Vout equals zero.

Both Vbias and Voffset can be considered bias supplies, as both affect the output Vout. So, either Vbias or Voffset (and correspondingly Ipixel and Ioffset) may be controlled to keep the output of the circuit significantly centered on average. The other biasing voltage is then, of course, typically set to a fixed level. For example, if Voffset is fixed (hence Ioffset is fixed), Vbias would then have to be adjusted. Solving equation 18 for Vbias yields:

$$Vbias = -\text{Rpixel\_avg} \times \frac{Voffset}{Roffset} \quad (19)$$

Variable Bias Voltage

Figure 10:
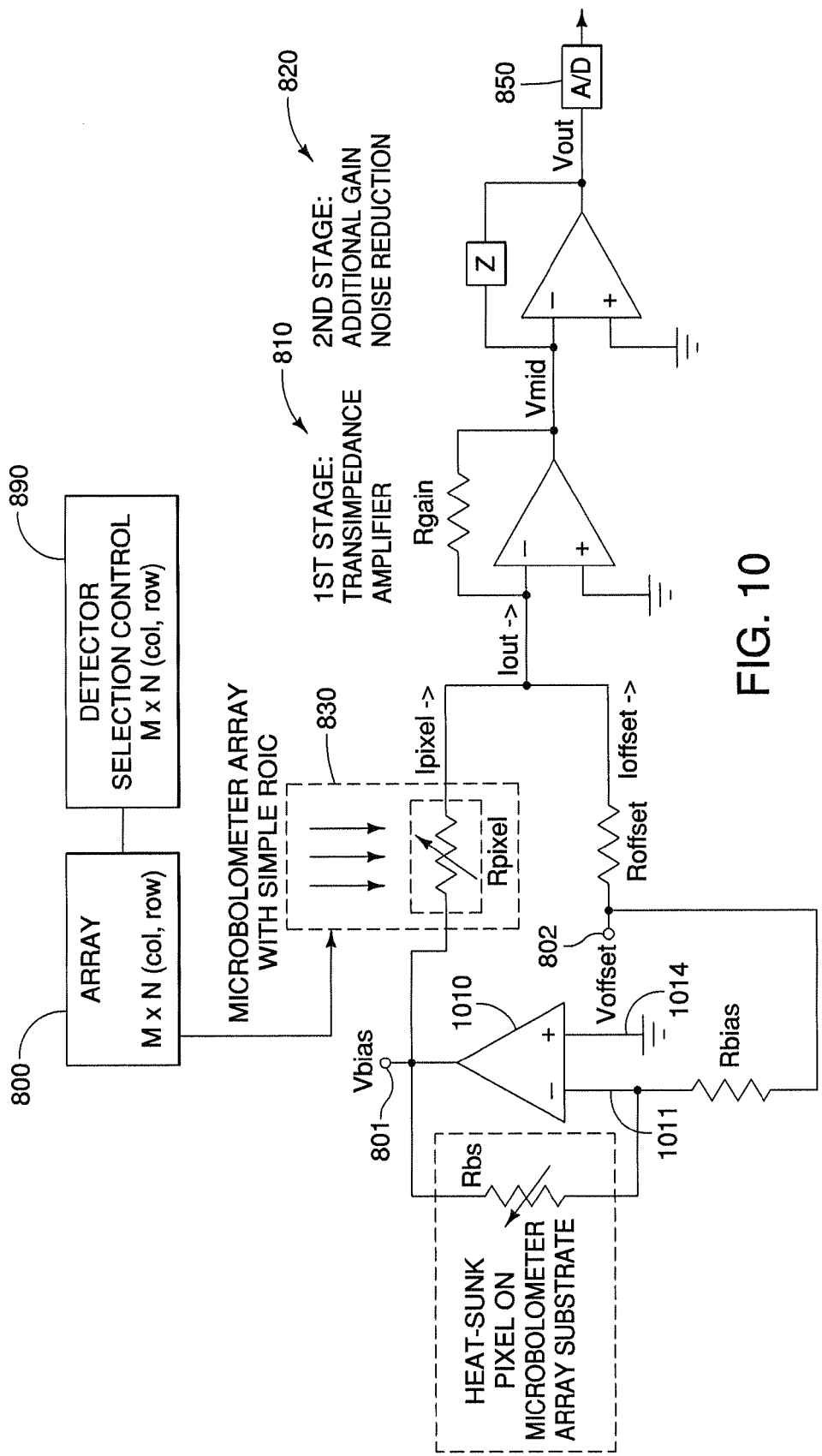
FIG. 10 is another schematic block diagram showing further details of the block diagram of FIG. 8 in accordance with the present invention.
Figure 12:
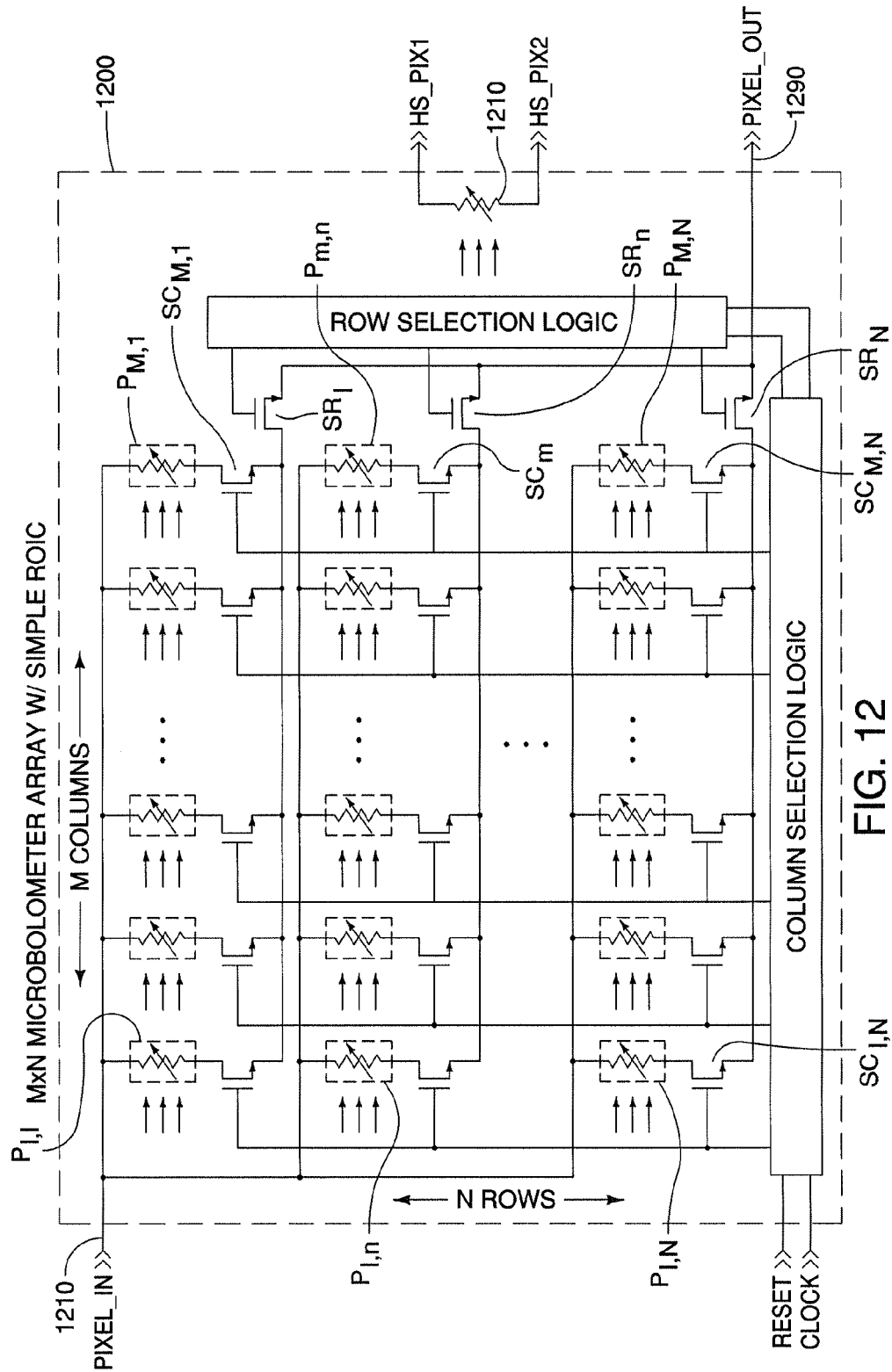
FIG. 12 is a schematic diagram of a microbolometer array with simple ROIC.

Illustrated in FIG. 10 is a schematic diagram of a readout circuit for a microbolometer focal plane array in accordance with one aspect of the present invention, and more specifically a variable bias voltage as substantially mathematically described by equation 19. In FIG. 10 those components similar in form and function to the readout circuit of FIG. 9 already described have retained the same numeral designations. In FIG. 10, an operational amplifier 1010 has its inverting input 1011 electrically coupled to the Voffset bias voltage supply, generally indicated by numeral 802, through a series resistance identified as Rbias. The heat sunk pixel, 1005, associated with the FPA as particularly illustrated in FIG. 12, is electrically connected between the output 1212 and the inverting input 1011 of operational amplifier 1010 for setting the gain thereof. The non-inverting input 1014 is electrically coupled to circuit ground or other reference potential as desired.

Before proceeding, it should be understood that Rpixel_avg (the average of all of the pixels of the array) will predominately vary in relation to the microbolometer array's (FPA) substrate temperature changes, but may also be affected by incident radiation and self-heating effects. An ideal discrete heat sunk pixel, 1005, having resistance Rhs, on the same substrate as the FPA would have substantially the same resistance vs. temperature characteristic as the average response of the thermally-isolated pixels, Rpixel. Thus, the resistance of an ideal, discrete heat sunk pixel, Rhs, would equal the average resistance of the thermally-isolated pixels with no incident infrared radiation. So, ideally:

$$Rhs = Rpixel\_avg \qquad (20)$$

Using this relationship, a heat-sunk pixel may be used to generate the voltage Vbias as shown illustrated in FIG. 10. Analysis of the circuit of FIG. 10 yields:

$$Vbias = -Rhs \times \frac{Voffset}{Roffset} \qquad (21)$$

It should be noted that if Rhs is substituted for Rpixel_avg, and Rbias is substituted for Roffset, we get equation 19, which defines the ideal formula for Vbias. So, assuming Rhs has a value that correlates to the average resistance of the microbolometers in the array, Vbias will automatically track changes in the substrate temperature and keep Vout centered around zero volts. Thus the circuit of FIG. 10 provides a readout circuit with this form of biasing as just described. In FIG. 10, it is assumed that the non-multiplexed heat-sunk pixel 1005 is on the focal plane array substrate. However, other circuit arrangements, including sample and hold circuits as well as A/D and D/A converters, and the like, could be implemented in order to employ a multiplexed heat sunk pixel.

In practice however, heat-sunk pixels often don't correlate to the thermally isolated pixels as well as may be desired to achieve desired performance characteristics employing such a simple biasing circuit. Self-heating affects heat-sunk pixels much less than thermally-isolated pixels, and process variations between pixels that are thermally-isolated versus thermally-shorted create resistance and TCR variations, much as they do for the thermally-isolated microbolometers.

Some solutions to this latter stated problem include physically changing the heat-sunk pixel structure to better correlate to the thermally isolated pixels (for example, by creating a slightly different geometry in the ROIC layout), and using two point electrical correction (gain and offset) in the biasing circuit to more closely match the thermally isolated pixel response. For example, the gain in the bias feedback circuit shown in FIG. 10 may be adjusted by changing the value of Rbias, or by putting another resistor in parallel with Rhs.

As is understood by those skilled in the art, offset adjustment may be implemented in numerous ways. For example, an additional current source may be injected into the inverting input of the amplifier. Alternatively, the voltage at the non-inverting input of the amplifier could be adjusted.

Figure 11:
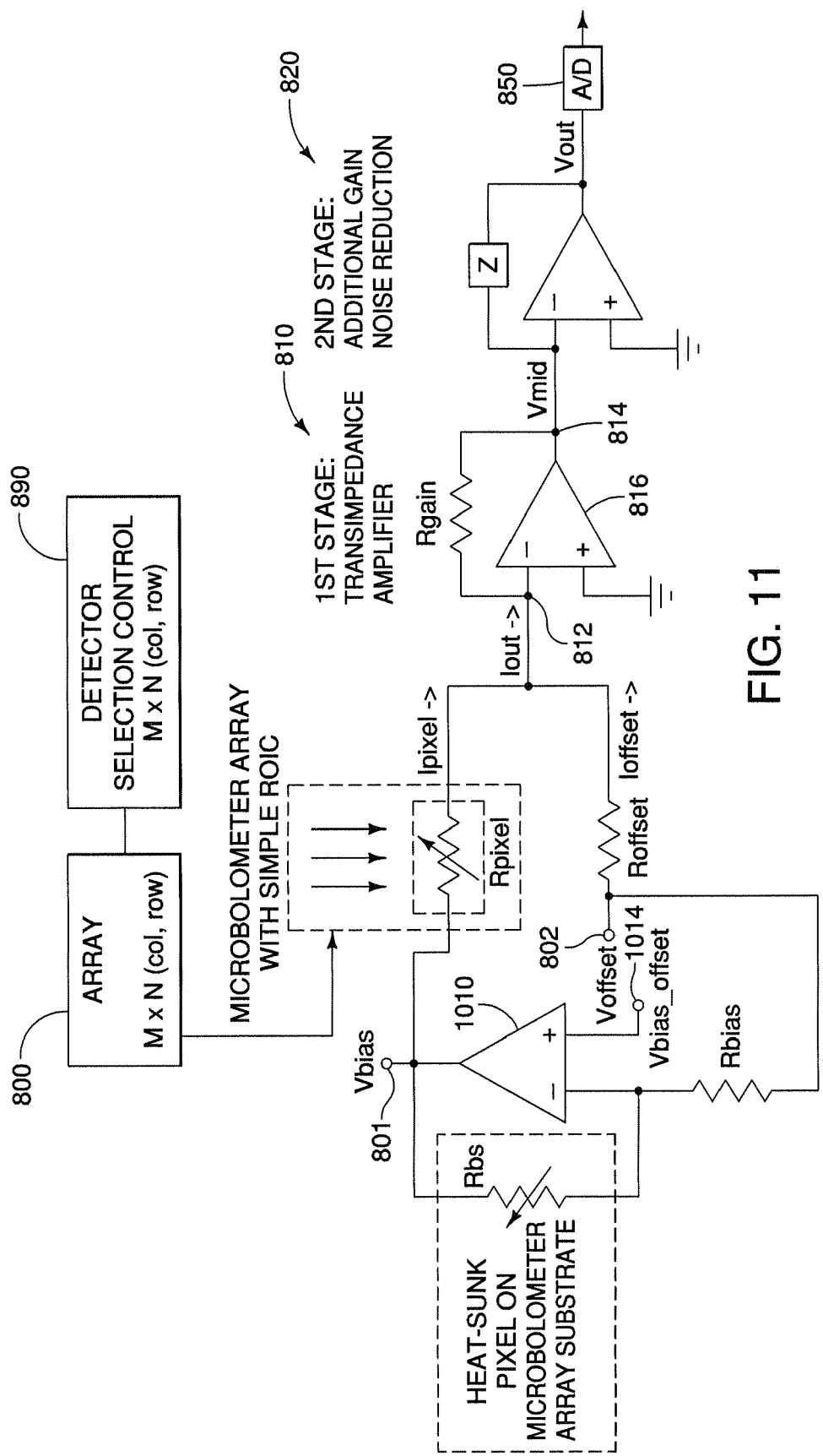
FIG. 11 is a schematic block diagram illustrating an alternative to that illustrated in FIG. 10.

Illustrated in FIG. 11 is an alternate circuit arrangement as that illustrated in FIG. 10, where like components as those in FIG. 10 have retained the same numeral designations in FIG. 11. The circuit arrangement of FIG. 11 includes offset correction applied at the non-inverting input of operational amplifier 1010. The bias voltage circuit of FIG. 11 is governed by the following equation:

$$Vbias = -Rhs \times \frac{Voffset - Vbias\_offset}{Rbias} \qquad (22)$$

A D/A converter (not shown) could also be employed to control the offset in the biasing circuit, e.g. by controlling Vbias_offset at the non-inverting input of operational amplifier 1010. In this manner, the bias voltage would be predominantly controlled by value of the heat-sunk pixel—however, the D/A converter would allow for fine tuning of the bias point, and would again require a bias control processor that analyzes the values at Vout and adjusts the bias circuit accordingly.

Further, it should be noted that gain and offset correction values may be determined empirically by subjecting a microbolometer focal plane array to various ambient temperatures while measuring the resistances of the pixels and the discrete heat sunk pixel structure. A simple linear regression performed on the heat-sunk resistance vs. the thermally-isolated resistance curves would yield a gain and offset coefficient that would significantly correct for the differing characteristics of the heat-sunk pixel vs. the thermally-isolated pixel array.

Microbolometer Focal Plane Array with Heat Sunk Pixel

FIG. 12 is a simplified schematic diagram of an exemplary microbolometer focal plane array 1200 intended to employ a pulse-biased integrated readout circuit (ROIC) as taught by Wood in U.S. Pat. No. 5,420,419. Similar to Wood, a two dimensional M×N array of substrate-isolated pixels having M columns wide by N rows high is depicted in FIG. 12. A PIXEL_IN signal line 1210, is intended to be electrically coupled to an electrical bias source—either current or voltage, and electrically coupled to one terminating end of every pixel of the array, $P_{mn}$. The other terminating end of each of the pixels is electrically coupled to the PIXEL_OUT output terminal 1290 through both a column selection MOSFET select switch, $SC_m$, and a row selection MOSFET select switch, $SR_n$.

The column selection logic is generally a simple series of shift registers, where only one column is selected at a time in a left to right fashion. At the end of each row, the column selection logic wraps around to the first column and the row selection logic selects the next row. After the last row has been selected, the row selection logic wraps around back to the first row. In this manner, each individual pixel in the array is selected in sequence from left-to-right, top-to-bottom. When RESET is asserted, no pixels are selected. Rising edges of a CLOCK signal are intended to cause the selection of the next pixel in the sequence.

Also shown in FIG. 12 is a discrete heat sunk pixel, 1250, having first and second terminating ends HS_PIX1 and HS_PIX2. Heat-sunk pixel, 1005, is intended to be thermally coupled to the silicon substrate of the substrate-isolated pixels of the array. Further, as illustrated, heat sunk pixel 1005 is not multiplexed by the readout circuit along with the M×N array of pixels.

In the preferred embodiment of the invention, heat sunk pixel 1005 serves as a temperature sensor having an electrical sensor parameter, namely resistance, that has a temperature characteristic behavior resembling the temperature characteristic behavior of the array of detectors in response to changes in substrate temperature, and preferably will significantly correlate with substrate temperature variations. Alternate temperature sensors, for example thermistors, may also be used that have similar characteristics as aforesaid.

Although not shown an ROIC readout circuit arrangement may also have additional components incorporated in the ROIC, such as amplifiers, integrators, etc. These more advanced ROICs typically have parallel integration of rows and may have bias correction on a per-pixel basis. The present invention may be applied to microbolometer arrays with more complicated ROICs as well. For example, if parallel amplifiers are contained with the ROIC, the biasing circuits described herein could also be contained within the ROIC, either for the overall bias, or even for row and/or columns biases.

As shown in FIG. 12, one or more heat-sunk pixels may be placed on the substrate of a focal plane array, each with their own signal connections. However, it may be advantageous to multiplex heat-sunk pixels within the M×N array as well.

Multiple Heat Sunk Pixels with Independent Bias

Figure 13:
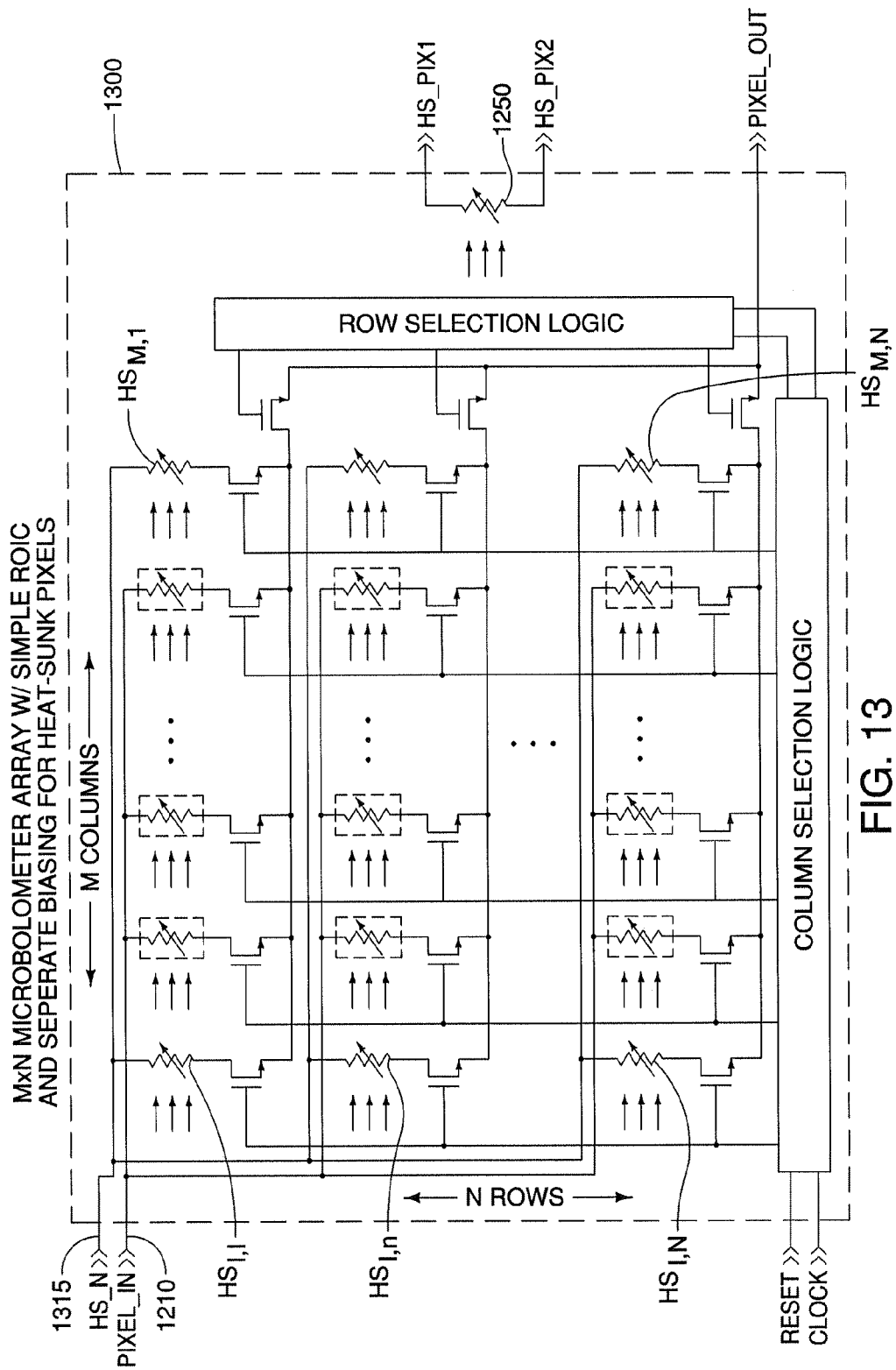
FIG. 13 is a schematic diagram of a microbolometer array with simple ROIC and separate biasing for heat sunk pixels.

FIG. 13 is a simplified schematic diagram of a microbolometer focal plane array with simple integrated readout electronics (ROIC), much like that already described with reference to FIG. 12. However, as illustrated in FIG. 13, the first and last columns of the M×N array have been replaced with heat-sunk pixels, identified as $HS_{1,1}$–$HS_{1,N}$, and $HS_{M,1}$–$HS_{M,N}$, respectively.

Further, an HS_IN signal line, 1315, is intended to be electrically coupled to another electrical bias source—either current or voltage, Vhs_bias, and electrically coupled to one terminating end of every heat sunk pixel of the array. The other terminating end thereof is electrically coupled to the PIXEL_OUT output terminal 1290 through both a column selection MOSFET select switch, $SC_m$, and a row selection MOSFET select switch, $SR_n$, as before.

Thus the arrangement depicted in FIG. 13 separately permits one electrical bias source to be applied to the substrate-isolated pixels through input terminal 1210 identified as PIXEL_IN, and another electrical bias source to be applied to the substrate-shorted heat sunk pixels through input terminal 1315 identified as HS_IN.

Incorporating heat-sunk pixels multiplexed within the focal plane array has many advantages such as: (i) the same circuitry may be used to read the heat-sunk pixels, which reduces circuit component count as well as allowing for better compensation for non-ideal ambient temperature effects in the pixel-reading electronics; (ii) temperature gradients across the array may be taken into consideration for establishing a compensation scheme; (iii) averaging multiple heat-sunk pixels resistance values, $R_{HS}$, provides better signal to noise; (iv) multiple heat-sunk pixels provides better reliability—heat sunk pixel resistance values may be monitored for performance, and bad heat-sunk pixels may be ignored, and not dependent upon a single failure causing system failure.

Multiple Heat Sunk Pixels with Independent Bias & 2-Point Correction

Figure 14B:
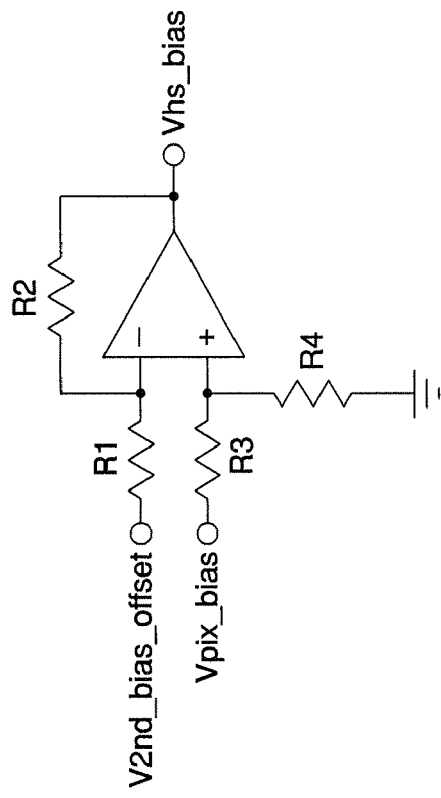
Figure 14A:
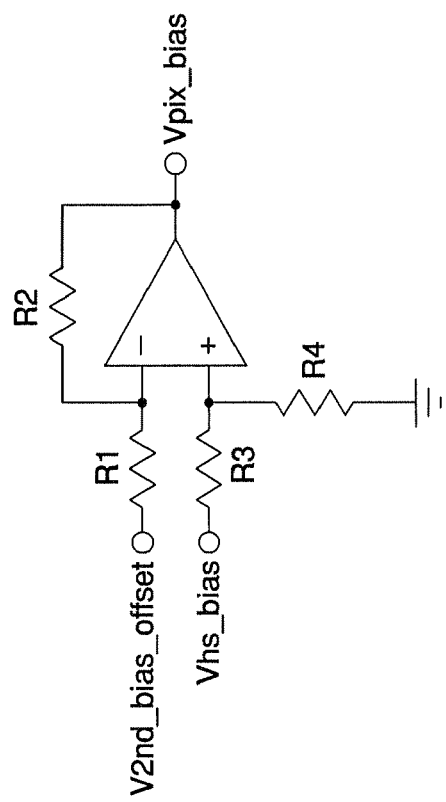
FIG. 14a is a schematic diagram of a bias circuit for an array of microbolometer thermally isolated pixels.

Further, since heat-sunk pixels in practice may not thermally correlate well with thermally-isolated pixels, it is desirable to supply all heat-sunk pixels with a separate biasing source. The dual bias signal input lines shown in FIG. 13, namely HS_IN and PIXEL_IN allow for this flexibility for providing separately coupled electrical bias sources, either voltage or current. Should the heat-sunk pixels correlate well enough with the thermally-isolated pixels, the two bias supplies may be simply tied together. If the characteristics are too dissimilar, one bias supply may be used to derive the other using a simple 2 point gain and offset correction as particularly shown in FIGS. 14A–B.

As illustrated, any bias supply method or circuit may be applied to create one of the bias sources, and the other bias source could be generated from the first. Simple circuits, such as a differential amplifier, may be used to generate one bias source from the other, each incorporating selected gain and offset corrections, that would correct for differences in response between the heat-sunk pixels and the thermally-isolated pixels. In the circuit arrangements illustrated in FIGS. 14A–B, if the circuit resistance values are such that R2/R1=R3/R4, then:

$$V\text{pix\_bias}=V\text{hs\_bias}*(R2/R1)-V2nd\_\text{bias\_offset}*(R2/R1) \quad (23)$$

where the heat sunk electric potential bias, Vhs_bias, is applied to all of the heat sunk pixels, i.e., HS_IN, and where Vpix_bias is applied to all of the substrata isolated detectors, i.e., PIXEL_IN.

In accordance with the embodiment of the invention illustrated in FIG. 13, a separate bias supply connection for the multiplexed heat sunk pixels permits enhanced compensation flexibility. For example, if separate electrical bias sources are not employed—i.e., a common bias supply, and if the heat-sunk pixels do not significantly resemble or match the response of the thermally-isolated pixels (and they typically do not), the dynamic range of the electronics must be increased to handle reading both types of pixels. In this scenario, overall performance would be decreased. By providing distinct bias supplies based on pixel type, the required dynamic range of the pixel reading electronics may remain as small as possible, yielding the best possible signal to noise for the resultant output signals, Vout—i.e., PIXEL_OUT.

Feedback Bias Employing Integration

The biasing circuits and methods of the present invention aforedescribed employ one or more heat-sunk pixels in an attempt to maintain the ROIC analog readout circuit output signal, Vout, at a desired level, particularly for a subsequently following A/D Converter.

Figure 15:
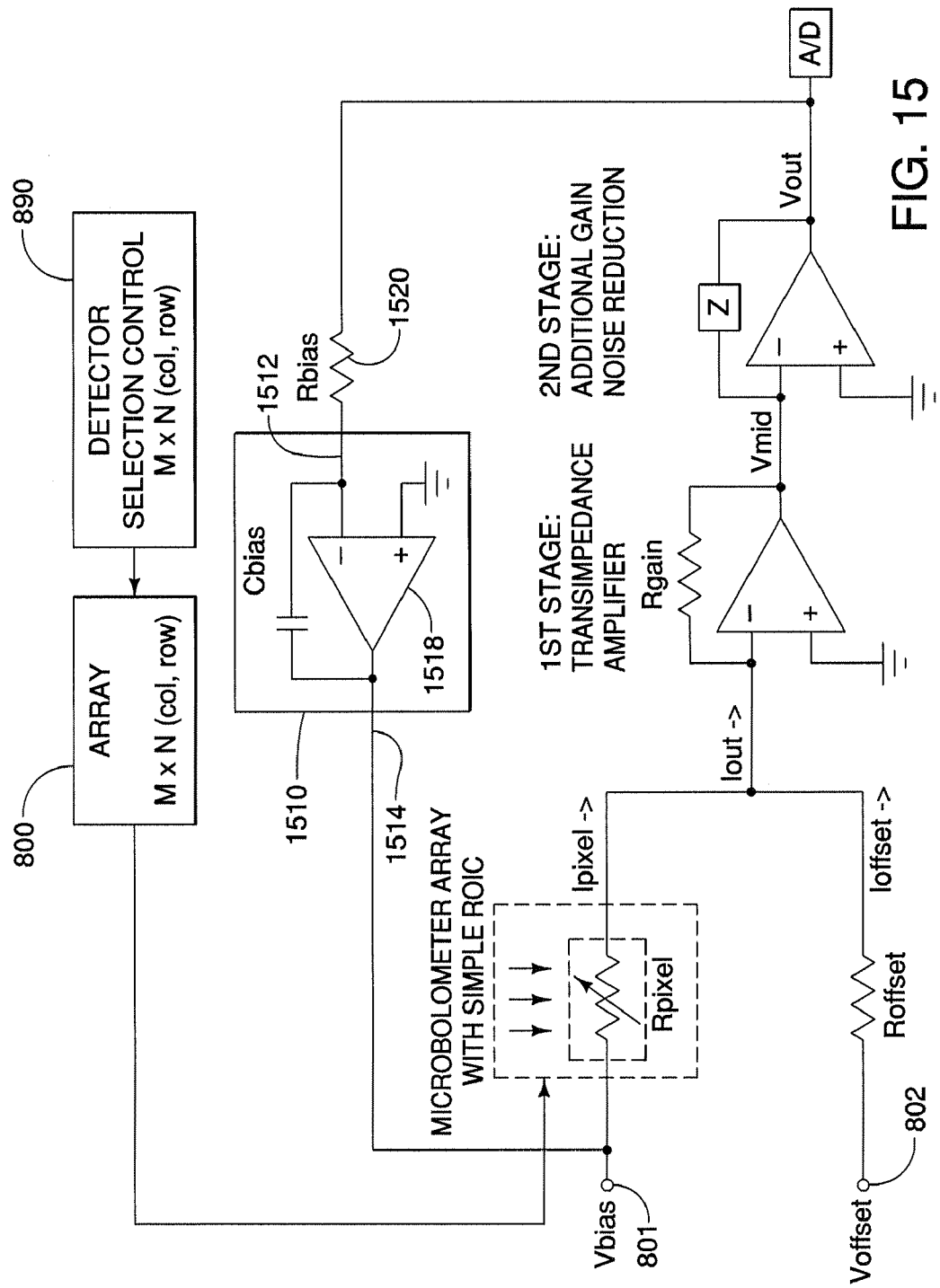
FIG. 15 is schematic block diagram of another embodiment of the present invention.

FIG. 15 illustrates another embodiment of the invention in accordance with the principles of the invention as already described. More specifically, varying the applied detector bias as a function of the thermal behavior of the pixels in response to substrate temperature. However, as will now be described, the thermal behavior of the detectors may be sensed by signal processing the detector output signal without necessarily employing a heat sunk pixel.

FIG. 15 illustrates a pixel readout circuit arrangement employing a feedback bias control circuit employing integration. The overall readout circuit arrangement illustrated in FIG. 15 is similar to that already described with reference to FIG. 8 where like components have retained the same numeral designations in FIG. 15 as those in FIG. 8.

In FIG. 15, an integrator 1510 is depicted having an operational amplifier 1514, and a feedback capacitor, Cbias, electrically coupled between the inverting input 1516 and the amplifier output 1518. (Other integrator circuit arrangements are, of course, possible.) The output, 824, of the transimpedance amplifier circuit Vout, including amplifiers 816 and 826, is electrically coupled to the inverting input 1512 through a bias resistor 1520 having a resistance value, Rbias.

The purpose of integrator 1510 is to automatically adjust the electrical bias source for the detector array 800—as illustrated, an electric potential source, Vbias, numerically designated at 801. As well understood, an integrator "adds up" the values seen at its input. The output of the integrator 1510 can then be electrically coupled to either Vbias or Voffset, with the other set to a fixed level—similar to FIGS. 10 and 14A–B.

In FIG. 15 the integrator output 1514 is shown electrically coupled to the Vbias terminal 801. By fixing Voffset (and hence Ioffset) to a known potential, the average current through the microbolometer pixels is kept at a constant level, significantly equal to Ioffset. As long as the TCR of the detector pixels is relatively constant over the operating range of substrate temperature, the corresponding change in Vout due to a given incident infrared radiation source should remain relatively constant as well. Accordingly, Vbias may be fixed, and Voffset controlled by the integrator circuit. However, this may not be as desirable, as the average value of Ipixel (and hence, pixel responsivity) will change over substrate temperature, and correspondingly the overall gain of the readout electronics will be dependent on the substrate temperature.

As illustrated, integrator 1510 polarity is chosen such that overall loop gain is negative. The polarity, of course, is determined by the overall gain of the transimpedance amplifier stage G, which is positive as illustrated in FIG. 15. If, however, the gain, G, is positive, then the integrator gain must be negative and vice versa. It should be noted, however, that overall loop feedback should be negative for stability of the circuit, as is well known by those skilled in the art.

In accordance with the present invention, the aforesaid integrator 1510 will function to automatically integrate the error seen at the input to the integrator and create an output value which in turn reduces the error in Vout. As illustrated in FIG. 15, the difference between the current level of Vout and the target level of Vout is zero. However, it is preferable to keep the bias voltage, Vbias, significantly stable during the readout of an entire focal plane array's worth of pixel data. Therefore, it should preferably not respond too quickly to changes in Vout. Accordingly, the bandwidth of the integrator must be low enough such that Vbias (or Voffset, as the case may be) appear significantly stable during the readout of an entire "frame" of pixel data, but still wide enough to allow Vbias (or Voffset) to follow changes in substrate temperature.

Fortunately, substrate temperature changes are relatively slow compared to a "frame" time, since most microbolometer focal plane arrays are mounted inside metal packages that provide a large thermal mass that is often tightly thermally coupled to the focal plane array substrate. For example, if a focal plane array camera has an overall frame rate of 30 Hz, then the bandwidth of the integrated bias feedback circuit should typically be less than 10 Hz, and more than 0.1 Hz. If the bandwidth is too low, substrate temperature changes may not change Vbias (or Voffset) quickly enough to provide the desired compensation. Alternately, if the bandwidth is too high, Vbias (or Voffset) may change too rapidly and the resulting processed image may show artifacts, or require extra image processing to correct for the rapidly change bias voltage.

Mathematically, bandwidth of a common inverting integrator, similar to that shown in FIG. 15, commonly called a Miller Integrator, is mathematically described by:

$$\text{Integrator Bandwidt, } BW = \frac{1}{2\pi CR} \quad (24)$$

where C is the value of the integrator's feedback capacitor (Cbias), and R is the input current limiting resistor (Rbias).

As will be understood by those skilled in the art, if the overall transimpedance amplifier gain G were negative instead of positive, the polarity of the integrator would then be need to be positive to maintain negative feedback in the overall feedback loop. The output may still be connected to Vbias or Voffset, as desired, with the other voltage set to a fixed level.

Accordingly, the feedback bias control method of the present invention as particularly described with reference to FIG. 15 requires no D/A converter, and may keep a microbolometer detector array biased properly over a very wide range of substrate temperatures.

It should be noted, that the ROIC output voltage, Vout, is a product of the pixel resistance and the bias voltage—pixel resistance being the intended parameter to be measured. Commonly, the ROIC output voltage, Vout, is converted to a digital signal value for subsequent signal processing, taking into account the value of the bias voltage, Vbias. Accordingly, if desired, an additional A/D converter may be employed to measure the resulting bias voltage of the circuit of FIG. 15—the output of the integrator 1510. In turn, a digital signal processor may calculate the detector pixel resistance values of the microbolometer array. The aforesaid bias voltage A/D converter may be an additional A/D converter, or the bias voltage could be multiplexed into the same A/D converter intended to determine pixel data, i.e., pixel resistance.

Feedback Bias Employing Integration with Selection Switch

Many microbolometer focal plane arrays tend to have "bad pixels" which have various attributes that make them undesirable for purposes of infrared imagery. Reasons include, but are not limited to, microbolometers that have resistances significantly different than the majority of the array, or have drastically different TCR values, or may have noise levels that are too high.

Figure 16:
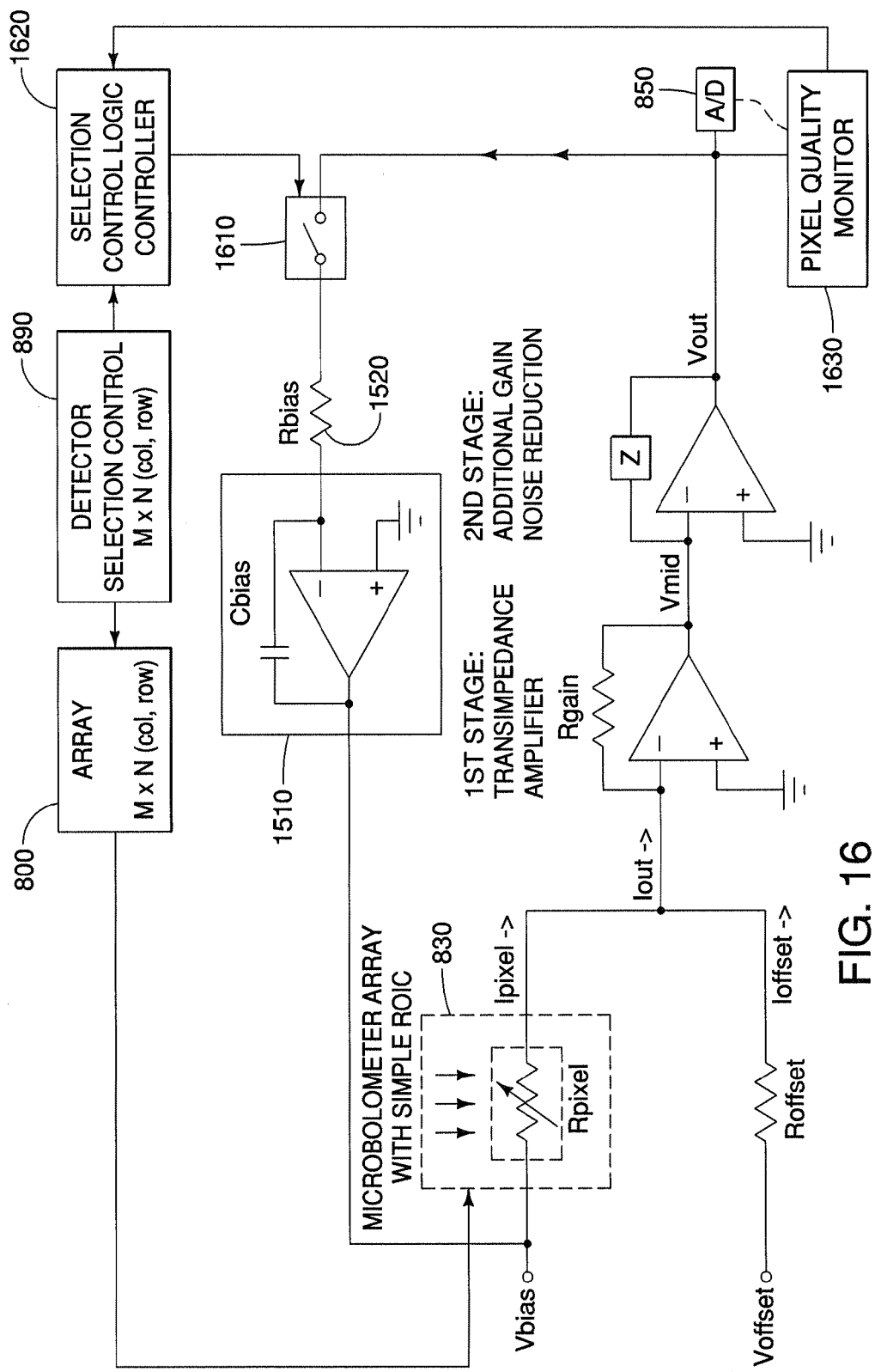
FIG. 16 is schematic block diagram of another embodiment of the present invention.
Figure 17:
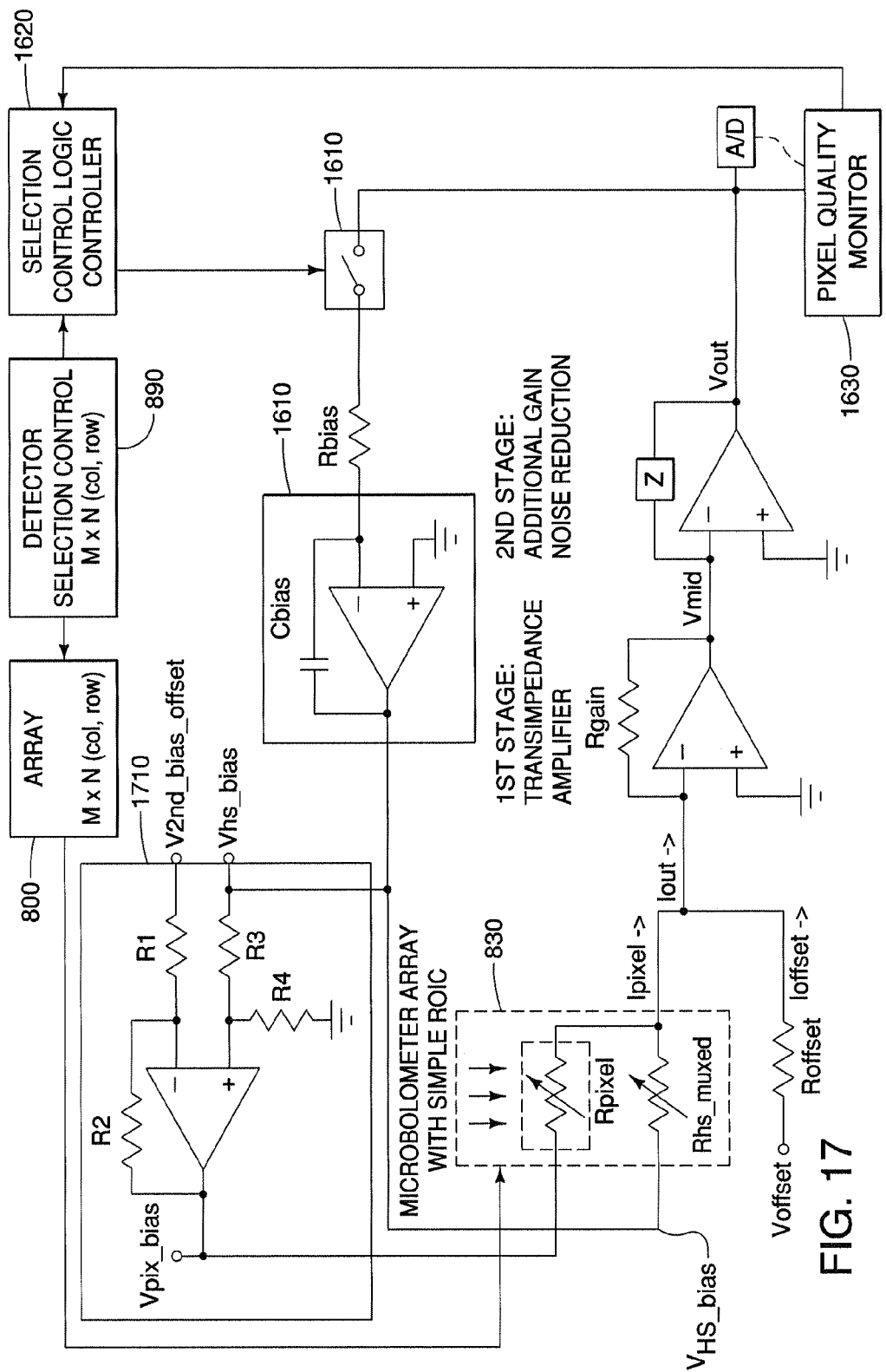
FIG. 17 is schematic block diagram of another embodiment of the present invention.

Illustrated in both FIGS. 16 and 17 is a feedback bias control circuit in accordance with another aspect of the present invention including a selection switch 1610 serving to selectively coupled the ROIC output voltage, Vout$_{mn}$, associated with selected ones of the M×N array of pixels of microbolometer pixels (FIGS. 12 and 13)—either substrate-isolated or heat sunk pixels. In FIGS. 16 and 17, like components similarly arranged and functioning as those in FIGS. 8 and 15 have retained the same numeral designations in FIGS. 16 and 17.

As illustrated in FIG. 16, an analog selection switch 1610 is electrically connected in series with bias resistor 1520 for selectively coupling to the input of the integrator the ROIC output voltage, Vout$_{mn}$, corresponding to selected ones of the array of substrate-isolated pixels or heat-sunk pixels,—i.e., temperature sensors. Selection control is provided via a command signal provided by selection control logic controller 1620 on signal line 1622.

Pixel selection controller 890 is intended to provide an enabling signal on signal lime 1625 presented to selection control logic controller 1620 for selectively and conditionally closing selection control switch 1610 at those times that the output signal Vout is associated with selected ones of the pixels of the array, as will more particularly be described.

Selection control logic controller 1620 receives inputs from a M×N pixel quality monitor 1630 which serves to monitor the behavior of each pixel of the M×N array of pixels, either or both substrate isolated detector pixels and heat sunk pixels serving as substrate temperature sensors, depending on the array design arrangement. Of course, pixel quality monitor 1630 make take on the form receptive to the analog output signal, Vout, or alternatively could be digital in nature and be responsive the output of the A/D converter 850, as desired. Pixel quality monitor 1630 is intended to provide a "disabling signal" as an input to selection control logic controller 1620 for those occurrences that either the detectors or heat-sunk pixels are undesirable and force switch 1610 to be open.

Although not shown, a memory map may be employed in conjunction with the pixel quality monitor for proper timing sequencing and operation of the integrator, as should be understood by those skilled in the art.

Pixel quality monitor 1630, responsive to the output signal Vout is also intended to provide as another input to selection control logic controller 1620 an enabling signal on signal line 1635 for enabling the operation of the selection switch 1610 only for those pixels that satisfy predetermined standards—i.e., an effective or non-defective pixel, either or both substrate isolated or heat sunk pixels. For example, the pixel behavior, i.e., resistance value, must be within predefined limits. This of course, may be implemented by way of simple comparator circuits.

Whatever the reason, selected pixels may be ignored by the bias feedback integrator by means of the selection switch 1610. Switch 1610 may be opened during the readout of pixels which are undesirable, and may be closed for those pixels which are desirable. The bias feedback integrator will hold it's output value while disconnected from it's input signal Vout. Selection switch 1610 allows for other possibilities, such as biasing based only on "good" pixels in a particular region of interest (e.g. the central part of the focal plane array.)

The logic and storage required to control selection switch 1610—namely the arrangement if the selection control logic controller 1620, pixel quality monitor 1630, and pixel selection controller 890, may be implemented via some form of programmable logic device (e.g. PLD, CPLD, FPGA) or some other form of digital logic and/or processors. Of course, its function may be implemented by wide array of digital techniques including software, firmware, and the like. Also, some form of memory (not shown) that would contain a "pixel map," i.e., that would contain the desired state of the selection switch 1610 for each pixel in the focal plane array, could also be provided by such logic networks, all of which are well known to those skilled in the art. For example, this circuitry could be combined with the existing logic needed for controlling the timing of the microbolometer focal plane array as aforesaid.

Feedback Bias Employing Integration with Heat-Sunk Pixels

The aforedescribed feedback bias arrangement is particularly advantageous where heat-sunk pixels are not employed, and only the output voltage associated with the detectors is integrated for establishing the detector electrical bias source, namely Vbias. The circuit arrangement of FIG. 17 illustrates a feedback bias control arrangement where a plurality of heat-sunk pixels are multiplexed within the microbolometer focal plane and are used via the array ROIC readout, and selectively provided as inputs to the bias feedback integrator 1510. More particularly, the circuit arrangement of FIG. 17 illustrates a circuit that uses the behavior of the heat-sunk pixels as input source for the integrating feedback bias control circuit for establishing the electrical bias source.

Referring now to FIG. 17 and the microbolometer array 800 depicted in FIG. 13, two bias sources are provided as part of the feedback bias control circuit including integrator 1510. As already described, the array includes detectors and heat sunk pixels, each being respectively coupled to different bias sources, namely, Vpix_bias and Vhs_bias, connected to signal input lines designated PIXEL_IN and HS_IN, respectively. In FIG. 17, only readout values associated with the heat-sunk pixels are provide as input to the integrated bias feedback circuit, namely, integrator 1510. Accordingly, selection switch 1610 is closed when the multiplexed heat-sunk pixels in the focal plane array are selected. Further, the second electrical bias, Vpix_bias is derived from the heat sunk pixel bias, Vhs_bias including gain and offset corrections by way of secondary bias source circuit 1710.

In FIG. 17, selection control logic controller 1620 is configured to only electrically couple signal Vout to integrator 1510 where the heat sunk pixels are selected by pixel selection controller 890. In other words, analog selection switch 1610 is intended to be closed when the multiplexed heat-sunk pixels in the focal plane array are selected, and open at other times—i.e, when the detector pixels are selected. Thus, switch 1610 only allows for a scenario where only the resultant heat-sunk pixel output voltages, Vout, are directed to the bias source generator as embodied by way of integrator 1510.

As described earlier, heat-sunk pixel resistances do not exactly correlate to the substrate-induced component of the thermally-isolated pixel resistances. When using heat-sunk pixels as the source for a bias feedback integrator, the output will be tied to Vbias_hs for the heat-sunk pixels only. The thermally-isolated pixel bias, Vbias_pix, can then be generated from Vbias_hs via a simple amplifier which incorporates gain and offset correction to better correlate the heat-sunk pixel response to the thermally-isolated pixel response. As illustrated, secondary bias source generator 1710 includes operational amplifier 1740. The input signal to the non-inverting input 1712 of amplifier 1711 is Vhs_bias through resistor R3, and the offset voltage is presented to the inverting input 1714 through resistor R1. The gain of amplifier 1711 is determined by the feedback resistor R2. Accordingly, the output voltage Vpix_bias, the bias source or the detectors, may be mathematically expressed by:

$$\text{Vpix\_bias} = \text{V2nd\_bias\_offset} \frac{R2}{R1} + \text{Vhs\_bias} \frac{R2 \times R4}{R3 + R4} \quad (25)$$

The operation of the readout circuit arrangement of FIG. 17 in combination of with detector array of FIG. 13, including a plurality of heat-sunk pixels which are multiplexed along with the detectors, will now be described. Integrator 1510 will be initiated with an operational value to initiate the system upon start up thereby establishing an electric potential bias source, Vhs_bias for heat sunk pixels, and an electric potential bias source, Vpix_bias for the detectors. Afterwards, the selection switch 1610 is only closed at those times that the detector selection control 890 couples heat sunk pixels to the readout circuit providing corresponding signals, Vout, electrically coupled to integrator 1510. Concurrently, the output of integrator 1510 provides a continuous updating of bias source, Vhs_bias, and circuit 1710 provides the bias source, Vpix_bias for the detectors as a function of the heat sunk pixel bias source in combination with the secondary offset voltage. Accordingly, the output voltages Vout, will continuously be within the range of the A/D converter 850 and minimally be affected by the substrate temperature thereby providing a highly accurate imaging apparatus.

It should be particularly noted that readout circuit and bias source generator in combination with array as depicted in FIG. 13 has a wide range of flexibility in combination with the pixel quality monitor 1630 and selection control logic controller 1620 in order to achieve enhanced performance. As indicated earlier, any group of detectors or heat sunk pixels could be used as the integrator input of signal data as desired.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

More specifically, as disclosed herein, the methods and circuits for biasing microbolometer focal plane arrays, FPAs, have been particularly directed at, and described in reference to, pulse-biased microbolometer FPAs, as taught by Wood in U.S. Pat. No. 5,420,419. However, it should be understood that similar methods and circuitry could be adapted by someone of ordinary skill in the art for use with continuously-biased microbolometer FPAs. Furthermore, while the present invention has been particularly shown and described with reference to the accompanying figures, it will be understood, however, that other modifications thereto are of course possible, all of which are intended to be within the true spirit and scope of the present invention. Various changes in form and detail may be made therein without departing from the true spirit and scope of the invention as defined by the appended claims.

It should be further appreciated that integrator 1510, analog switch 1610, bias source generator 1710 may be accomplished by way of digital techniques well within known skills of the artisan, all of which are intended to be within the true spirit and scope of the accompanying claims.

Furthermore, one or more of any of the blocks or components as depicted in the drawings may also be combined and digitally processed in order achieve the intended function, all of which are intended to be within the true spirit and scope of the accompanying claims.

Although in the preferred embodiments of the invention, a heat sunk pixel is taught as the predominant implementation for a temperature sensor that has a electrical parameter in the form of resistance that has a temperature characteristic that resembles the temperature characteristic of the detector pixels. However, other types of temperature sensors may also be employed, all of which are intended to be within the true spirit and scope of the present invention.

We claim:

1. A microbolometer imaging apparatus, comprising:
    an array of selectable substrate-isolated microbolometer detectors for being exposed to a target scene of interest, each detector having a resistance value $Rpixel_n$ associated with the nth detector, $D_n$;
    an electrical bias source being selectively coupled to each detector; and
    a readout circuit for establishing a corresponding output signal, $South_n$, representative of the resistance value, $Rpixel_n$ associated with the nth detector, $D_n$, at a given instant, the readout circuit comprising:
        a temperature sensor thermally coupled to the array substrate, the temperature sensor exhibiting an electrical sensor parameter having a temperature characteristic behavior generally resembling the temperature characteristic behavior of the detectors in the array; and
        a bias source generator that generates the electrical bias source as a linear function of the electrical sensor parameter.

2. The microbolometer imaging apparatus of claim 1, wherein said temperature sensor includes at least one of a thermistor and a heat-sunk pixel.

3. The microbolometer imaging apparatus of claim 1, wherein the electrical sensor parameter exhibited by the temperature sensor is resistance, whereby the bias source generator generates the electrical bias source as a linear function of the temperature sensor resistance.

4. The microbolometer imaging apparatus of claim 3, wherein the electrical bias source is an electric potential bias source, Vbias, whereby Vbias is generated as a linear function of temperature sensor resistance.

5. The microbolometer imaging apparatus of claim 3, wherein the electrical bias source is a current bias source, Ibias, and Ibias is generated as an inverse function of the temperature sensor resistance.

6. The microbolometer imaging apparatus of claim 1, wherein the temperature sensor is comprised of a plurality of resistive elements.

7. The microbolometer imaging apparatus of claim 6, wherein each resistive element is thermally coupled to the array substrate in thermal proximity to a selected row or column of the detectors that form the array.

8. The microbolometer imaging apparatus of claim 6, wherein the electrical sensor parameter exhibited by the temperature sensor is an average resistance of the plurality of resistive elements.

9. The microbolometer imaging apparatus of claim 6, wherein the resistive elements are heat-sunk pixels.

10. The microbolometer imaging apparatus of claim 1, wherein the readout circuit further includes a transimpedance amplifier for establishing the output signal, $Sout_n$, as a function of a pixel current, $Ipixel_n$, the pixel current, $Ipixel_n$, being based on the electric potential bias source and the detector resistance, $Rpixel_n$, for selected ones of the detectors.

11. A microbolometer imaging apparatus, comprising:
    an array of selectable substrate-isolated microbolometer detectors for exposure to a target scene of interest, each detector having a resistance value $Rpixel_n$ associated with the nth detector, $D_n$;
    an electrical bias source being selectively coupled to each detector; and
    a readout circuit for establishing a corresponding output signal, $Sout_n$, representative of the resistance value, $Rpixel_n$ associated with the nth detector, $D_n$, at a given instant, the readout circuit comprising:
        a temperature sensor thermally coupled to the array substrate, the temperature sensor having a resistance that varies based on the temperature of the array substrate;
        a bias source generator that generates the electrical bias source as a function of the electrical sensor parameter;
        a pixel current circuit for establishing a pixel current, $Ipixel_n$, as a function of the electrical bias source and the detector resistance, $Rpixel_n$, for selected ones of said detectors; and
        a transimpedance amplifier for establishing the output signal, $Sout_n$, as a function of the pixel current, $Ipixel_n$, the pixel current, $Ipixel_n$.

12. The microbolometer imaging apparatus of claim 11, further including an offset current circuit for establishing an offset current, $Ioffset_n$, as a function of Voffset, where Voffset is representative of the value of another electric potential source.

13. The microbolometer imaging apparatus of claim 12, wherein the transimpedance amplifier has an input and an output, the input summing the pixel current and the offset current, the output establishing the output signal, $Sout_n$, based on the sum of the pixel current and the offset current.

14. The microbolometer imaging apparatus of claim 12, wherein the electric potential bias source generating means includes an operational amplifier having a first input, a second input, and an output, the first input electrically coupled to the temperature sensor, and to the offset current circuit through a bias impedance Rbias, the second input electrically coupled to a selected reference potential, and the output for supplying the electric potential bias source.

15. The imaging apparatus of claim 14, wherein the temperature sensor is connected between the operational amplifier output and first input such that the resistance of the temperature sensor varies the gain of the operational amplifier based an changed in the temperature of the array substrate.

* * * * *